(12) United States Patent
Spadaccia et al.

(10) Patent No.: US 12,331,780 B2
(45) Date of Patent: Jun. 17, 2025

(54) BEARING BLOCK AND METHOD OF FORMING

(71) Applicant: SAINT-GOBAIN CERAMICS & PLASTICS, INC., Worcester, MA (US)

(72) Inventors: Julio Cesar T. Spadaccia, Windermere, FL (US); Ethan Weikleenget, Quaker Hill, CT (US); Brian K. Malpass, Auburn, MA (US); Raymond J. Remillard, Oxford, MA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 0 days.

(21) Appl. No.: 18/721,394

(22) PCT Filed: Dec. 27, 2022

(86) PCT No.: PCT/US2022/082398
§ 371 (c)(1),
(2) Date: Jun. 18, 2024

(87) PCT Pub. No.: WO2023/129908
PCT Pub. Date: Jul. 6, 2023

(65) Prior Publication Data
US 2024/0418210 A1 Dec. 19, 2024

Related U.S. Application Data

(60) Provisional application No. 63/266,111, filed on Dec. 29, 2021.

(51) Int. Cl.
*F16C 17/02* (2006.01)
*C23C 2/00* (2006.01)
*F16C 33/04* (2006.01)

(52) U.S. Cl.
CPC .......... *F16C 17/02* (2013.01); *C23C 2/00344* (2022.08); *F16C 33/04* (2013.01); *F16C 33/043* (2013.01)

(58) Field of Classification Search
CPC .... F16C 13/02–06; F16C 17/02; F16C 17/12; F16C 33/04; F16C 33/043;
(Continued)

(56) References Cited

U.S. PATENT DOCUMENTS 5,072,689 A * 12/1991 Nakagawa ............ C23C 2/0038
384/283
5,083,873 A * 1/1992 Momose ................. F16C 17/10
384/280
(Continued)

FOREIGN PATENT DOCUMENTS

JP        2592106 B2    3/1997
JP    2001335363 A    12/2001
(Continued)

OTHER PUBLICATIONS

Hitachi Ceramics, Ceramics Application for Continuous Galvanizig Line (CGL), Hitachi Metals, Ltd., 2019, 2 pages.
(Continued)

*Primary Examiner* — Alan B Waits
(74) *Attorney, Agent, or Firm* — Abel Schillinger, LLP; Adrian Lawrence

(57) ABSTRACT

A bearing block can include a body including an exterior surface and an interior surface defining a central bore of the body. The exterior surface can include a first material, and the interior surface can include a second material, wherein the first material can be different than the second material.

16 Claims, 5 Drawing Sheets

DETAIL B

(58) Field of Classification Search
CPC ....... F16C 2206/40–60; F16C 2240/48; C23C 2/00344

See application file for complete search history.

(56) References Cited

U.S. PATENT DOCUMENTS

| | | | | |
|---|---|---|---|---|
| 5,252,130 | A | * | 10/1993 | Ookouchi ........... C23C 2/00344 118/423 |
| 5,538,558 | A | * | 7/1996 | Ookouchi ........... C23C 2/00344 384/907 |
| 5,538,559 | A | | 7/1996 | Kleimeyer et al. |
| 5,571,327 | A | * | 11/1996 | Ookouchi ............. C23C 2/0038 492/27 |
| 6,729,766 | B2 | | 5/2004 | Hall |
| 7,234,869 | B1 | | 6/2007 | Morando |
| 7,235,506 | B2 | | 6/2007 | Suyama et al. |
| 11,168,388 | B2 | * | 11/2021 | Niedringhaus ..... C23C 2/00344 |
| 2003/0198417 | A1 | | 10/2003 | Yamamoto et al. |
| 2011/0008604 | A1 | | 1/2011 | Boylan |
| 2018/0002796 | A1 | | 1/2018 | Niedringhaus et al. |
| 2019/0194790 | A1 | | 6/2019 | Cadotte et al. |
| 2019/0376171 | A1 | | 12/2019 | Cadotte et al. |
| 2020/0148597 | A1 | | 5/2020 | Spadaccia et al. |

FOREIGN PATENT DOCUMENTS

| | | |
|---|---|---|
| JP | 3773080 B2 | 5/2006 |
| JP | 2012225514 A | 11/2012 |
| JP | 5822705 B2 | 11/2015 |
| JP | 2017067289 A | 4/2017 |
| KR | 19990052512 A | 7/1999 |
| WO | 2020159505 A1 | 8/2020 |
| WO | 2023129908 A1 | 7/2023 |

OTHER PUBLICATIONS

International Search Report and Written Opinion for PCT/US2022/082398, mailed May 2, 2023, 12 pages.

WearGuard Ceramic Bearings, McDanel Advanced Ceramic Technologies, mcdanelceramics.com, last accessed Jun. 21, 2021, 4 pages.

* cited by examiner

SECTION B-B

DETAIL C

SECTION A-A　　　　SECTION C-C

BEARING BLOCK AND METHOD OF FORMING

CROSS-REFERENCE TO RELATED APPLICATIONS

This application is a National Stage entry under 35 U.S.C. § 371 of International Application No. PCT/US2022/082398, filed Dec. 27, 2022, entitled "BEARING BLOCK AND METHOD OF FORMING," by Julio Cesar T. SPADACCIA et al., which claims priority under 35 U.S.C. § 119(e) to U.S. Provisional Application No. 63/266,111, filed Dec. 29, 2021, entitled "BEARING BLOCK AND METHOD OF FORMING," by Julio Cesar T. SPADACCIA et al., all of which are assigned to the current assignee hereof and incorporated herein by reference in their entireties.

TECHNICAL FIELD

The present application relates in general to bearing blocks and methods of forming the same.

BACKGROUND ART

Bearings are used in metal coating lines. The service life of bearings, in particular, those submerged in liquid metal, can affect productivity of the coating lines. Metallic bearings are typically used in submerged rollers and known to have relatively short service life. The industry continues to demand improved bearings.

BRIEF DESCRIPTION OF THE DRAWINGS

Embodiments are illustrated by way of example and are not limited in the accompanying figures.

Figure 1:
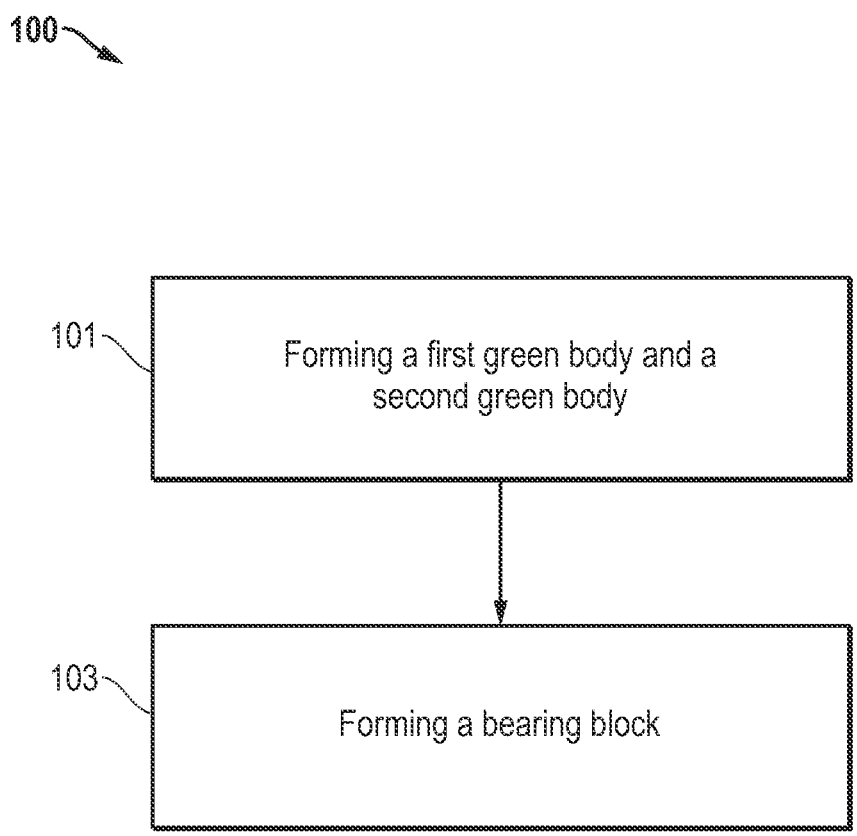
FIG. 1 includes a flowchart including a process for forming a refractory article according to an embodiment FIG. 2A includes a side view illustration of a refractory article according to an embodiment.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE PREFERRED EMBODIMENT(S)

The following description, in combination with the figures, is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises." "comprising." "includes," "including." "has," "having," or any other variation thereof are intended to cover a non-exclusive inclusion. For example, a process, method, article, or apparatus that comprises a list of features is not necessarily limited only to those features but can include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one, and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting.

Embodiments herein relate to bearing blocks including a ceramic material. The bearing block can include a body including a central bore extending through the entire length of the body. The central bore can be defined by an interior surface of the body including a ceramic material. The body can include an exterior surface defining the outline of the bearing block and including a ceramic material. In a particular embodiment, the interior surface may include a different material than the exterior surface. In another particular embodiment, the bearing body may consist essentially of a ceramic material. The bearing block can have improved properties including heat resistance, thermal shock resistance, wear resistance, coefficient of friction, strength, chemical reactivity, or any combination thereof. The bearing block can also be suitable for applications involving a harsh environment, such as high temperatures (e.g., at least 500° C.). In particular embodiments, the bearing block can be a suitable component for a metal coating line or a galvanizing system. For example, the bearing block can include improved performance, such as reduced vibration, improved resistance against metal penetration, and prolonged service life, and can facilitate improved coating quality when used in a metal coating line.

Embodiments further relate to a process of forming the bearing block.

FIG. 1 includes a flowchart illustrating a process 100 for forming a bearing block according to an embodiment. As illustrated, the process can be started by forming a first green body and a second green body at block 101. In an embodiment, the first and second green bodies may be formed separately. For example, the process 100 may include placing a first material into a production tool to form a first green body. The process 100 may further include placing a second material into a production tool to form a second green body.

The production tool may be an object having a cavity of a desired size and shape to facilitate forming the desired bearing block. For example, the production tool may include a mold. In another example, the production tool may be a vessel or system for forming the first and/or second green body and/or finally-formed bearing block. For example, the production tool may be an additive manufacturing chamber (e.g., three-dimensional printing chamber), wherein the first and/or second green body is formed from controlled formation of smaller components. Accordingly, the production tool need not necessarily be limited to mold.

Certain suitable processes for forming the green body can include molding, casting, pressing, drying, cooling, heating, irradiating, or any combination thereof. In one particular embodiment, the process of forming the green body can include pressing the the first material or the second material in their respective production tool to form a green body. Some suitable examples of such processes can include cold pressing, warm pressing, hot pressing, or any combination thereof.

The first material can be a dry mixture or a wet mixture, wherein a wet mixture includes a least one liquid additive. For example, the first material may include one or more dry powder components combined together. In still another embodiment, the first material may be a wet mixture including solid material contained in a liquid carrier, such as in the form of a slurry. In instances, a temporary binder material, dispersant, sufactant, or the like, or any combination thereof may be used. In accordance with an embodiment, the first material may include a ceramic material, such as an oxide, carbide, boride, nitride, or any combination thereof. In particular instances, the first material can include a powder material including a carbide, such as silicon carbide.

The second material can include a dry mixture or wet mixture. In instances, a temporary binder material, dispersant, sufactant, or the like, or any combination thereof may be used. The second material can include an oxide, carbide, nitride, or any combination thereof. In one particular embodiment, the second material can include silicon carbide, silicon nitride, silicon oxynitirde, or any combination thereof. In at least one embodiment, the second material can include a ceramic powder material including a carbide material, such as silicon carbide.

In a further embodiment, forming the first and second green bodies may be performed in the same production tool. In an instance, the first material can be placed into the production tool by depositing the first material into a cavity in the production tool, such that the first material forms a layer in a portion of the cavity of the production tool. After placing the first material into a production tool, the process can continue by placing a second material into the production tool. The second material can be deposited into the same cavity containing the first material. More specifically, the second material can be deposited as a layer overlying the first material. For example, the second material may be overlying and in direct contact with the first material. In at least one embodiment, the process of placing the first and second materials into the production tool can include selectively layering the first material as a first layer and depositing the second material into the same cavity of the production tool as layer in direct contact with and overlying the layer of the first material. It will be appreciated that the order of materials deposited into the cavity can be altered depending upon the forming process. In at least one embodiment, the green body and finally-formed bearing block may be formed in the same production tool.

In another embodiment, the process 100 may include forming a green body including a first portion including the first material and a second portion including the second material. In particular, the second material may be disposed inside the cavity of the first material to form the inner portion and the first material may enclose the second portion forming the outer portion. In one embodiment, the process of forming the green body and the bearing block can be completed in a single forming process in a single processing vessel (e.g., the production tool). Instead, the finally-formed refractory article may be formed directly from the raw materials deposited in the production tool, such that a free-standing green body may not necessarily be formed and removed from the processing vessel. One example includes an additive manufacturing process that forms the green body and fires the green body in the same processing vessel. Still, it will be understood that other processes may form a free-standing green body that is subject to one or more processes and/or handling prior to the process used to form the finally-formed bearing block.

After forming the first and second green bodies at step 101, the process can continue at step 103 by forming a bearing block from the green bodies. In an embodiment, the process 100 can include forming a green structure including the first green body and the second green body by placing the second green body inside the cavity of the first green body such that the second green body can be enclosed by the first green body. In instances, a portion of the first green body may contact the second green body. In another instance, a certain clearance may be present between the first and second green body. In a further embodiment, the process 100 can include firing the first and second green bodies. In a particular embodiment, firing can include co-firing the first and second green bodies. For example, firing can include firing the green structure including the second green body enclosed by the first green body.

In another particular embodiment, forming the bearing block can include firing the first and/or the second green body at a firing temperature of at least at least 1200° C., such as at least 1300° C. at least 1400° C. or even at least 1500° C. In another embodiment, the firing temperature may be not greater than 2000° C., such as not greater than 1900° C. or not greater than 1800° C. or not greater than 1700° C. It will be appreciated that the firing temperature can be within a range between any of the minimum and maximum values noted above, including for example within range of at least 1200° C. to not greater than 2000° C.

The firing process may be conducted in a particular atmosphere. For example, the firing atmosphere may include at least one atmospheric condition from the group of inert, oxidizing, reducing, or nitrogen-rich. In one particular embodiment, the atmospheric condition during firing can be a nitrogen-rich atmosphere, such that at least the majority (i.e., greater than 50 vol %, such as at least 51 vol %) or at least 60 vol % or at least 80 vol % or even at least 99 vol % of the atmosphere is nitrogen. In a particular embodiment, the atmosphere during firing may include a combination of conditions, including for example, a first portion of the firing process conducted in a nitrogen-rich atmosphere and thereafter, a second portion of the firing process can be conducted in an inert or oxidizing atmosphere.

In a particular embodiment, firing can include co-firing the first green body and second green body to form the body of the finally-formed bearing block including the first portion and the second portion associated with the first material and second material, respectively. In particular, the first portion and second portion may be bonded to each other through necking and grain growth mechanisms during the co-firing process. Still, as described in other embodiments, the first and second portions may be in abutting contact or interlocked to facilitate improved formation and performance of the bearing block.

In an embodiment, the bearing block can include a body including an exterior surface and a sliding surface defining a central bore of the bearing block. The exterior surface may define the shape of the bearing block. The sliding surface may be in contact with the object that is placed in the central bore of the bearing block. Such object may include, for instance, a shaft, a sleeve, or a combination thereof.

Figure 2A:
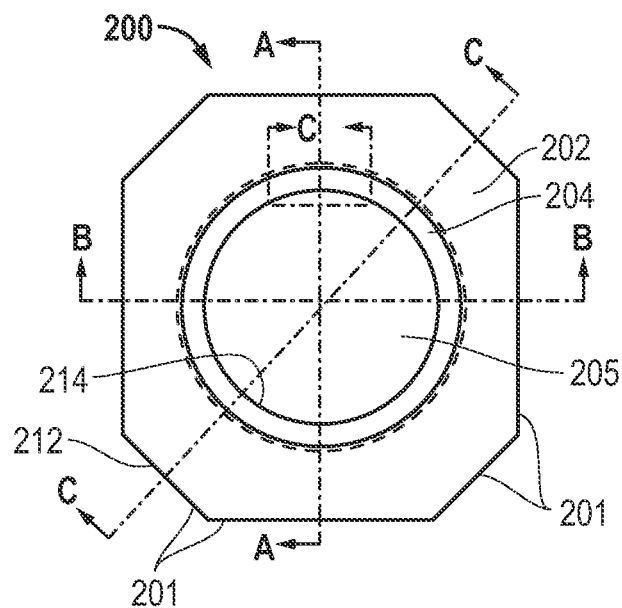
FIG. 2B includes a illustration of a magnified view of a portion of the refractory article of FIG. 2A.
FIGS. 2C to 2E include cross-sectional illustrations of portions of the refractory article of FIG. 2A.
Figure 2B:
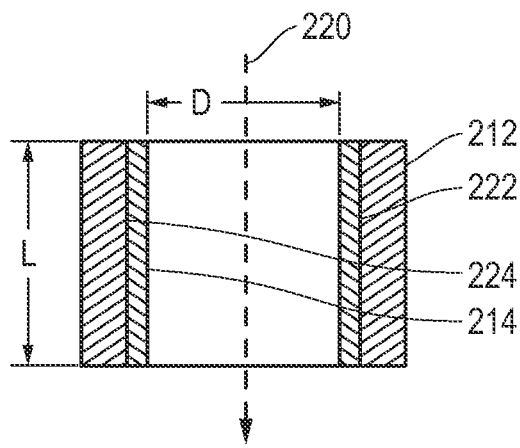

In an embodiment, the body of the bearing block can include an outer portion and an inner portion. FIG. 2A includes an illustration of a side view of an exemplary bearing block according to an embodiment. The bearing block can include a body 200 including an outer portion 202, an inner portion 204 abutting the outer portion 202, and the central bore 205 enclosed by the inner portion 204. The inner portion 204 can extend coaxially with the outer portion 202. FIG. 2B includes an illustration of section B-B of the body 200. As illustrated, the body 200 can include a longitudinal axis 220 and the length, L, extending in the axial direction. The central bore 205 can extend through the body, such as for the entire length L of the body. The inner portion 204 can extend coaxially with the outer portion 202 for the entire length, L, of the body 200.

The outer portion 202 can include an outer surface defining the exterior surface 212 and an inner surface 222. In a particular embodiment, the inner surface 222 may be a circumferential surface. The inner portion 204 can include an inner circumferential surface defining the interior circumferential surface 214 of the body 200. The inner portion 204 can further include an outer surface 224 abutting the inner surface 222 of the outer portion 202. In a particular embodiment, the outer surface 224 may be a circumferential surface. The interior circumferential surface 214 may form the sliding surface of the bearing and define the central bore 205 of the body 200. In particular examples, the outer portion 202 and the inner portion 204 can be in abutting contact. For example, at least a majority or substantially all of the entire outer surface 224 of the inner portion 204 and of the entire inner surface 222 of the outer portion 202 may be in abutting contact.

In an embodiment, the inner portion 204 may be coupled to the outer portion 202. In particular, the inner portion 204 can be coupled to the outer portion 202 in a manner such that the inner portion 204 may not rotate relatively to the outer portion 202. In particular embodiments, the inner portion 204, the outer portion 202, or both may include features that may facilitate coupling of the inner portion 204 and the outer portion 202. For example, the inner portion 204 and outer portion 202 may include complementary structures that may facilitate coupling. In an example, complementary structures may include matching flat regions at the outer surface 224 of the inner portion 204 and at the inner surface 222 of the outer portion 202. For example, the inner surface 222 of the outer portion 202 may include a planar portion, and the outer surface 224 of the inner portion 204 may include a planar portion corresponding to the planar portion of the inner surface 222. The matching flat regions can help prevent relative rotation of the inner portion 204 and the outer portion 202.

Figure 2C:
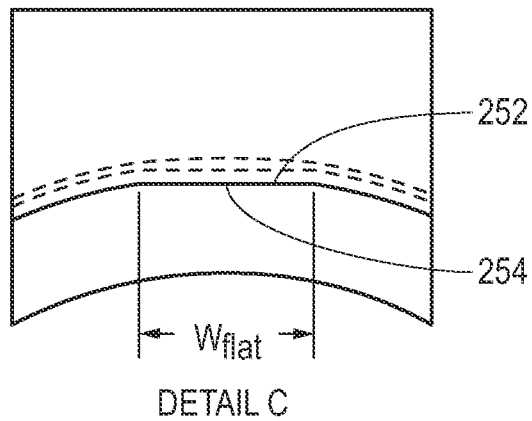

FIG. 2C includes an illustration of a magnified view of the portion C of the body 200 illustrated in FIG. 2A. The inner portion 204 includes a flat region 254 at the outer surface 224, and the outer portion 202 includes a matching flat region 252 at the inner surface 222. The flat regions 252 and 254 may include a similar or same particular width, $W_{flat}$ that may facilitate improved coupling of the inner portion 204 and the outer portion 202 and performance of the bearing block. In a further embodiment, the flat regions 252 and 254 may be in abutting contact for a majority of or the entire width, $W_{flat}$. In an example, the width, $W_{flat}$, may be at least 1% of the diameter D of the central bore 205, such as at least 2%, at least 5%, at least 7%, at least 9%, at least 10%, at least 12%, at least 13%, or at least 15% of the diameter D of the central bore (illustrated in FIG. 2B). In a further example, the width, $W_{flat}$, may be at most 45%, at most 40%, at most 36%, at most 32%, at most 30%, at most 27%, or at most 25% of the diameter D of the central bore. Moreover, the width, $W_{flat}$, may be in a range including any of the minimum and maximum values noted herein. In another embodiment, the flat regions 252 and 254 may include a width $W_{flat252}$ and $W_{flat254}$, respectively, wherein $W_{flat252}$ is different from $W_{flat254}$.

The flat regions 252 and 254 can extend in the axial direction for a similar or same particular length that may facilitate improved coupling of the outer and inner portions 202 and 204 and/or performance of the bearing block. The length of the flat regions 252 and 254 may be referred to as $L_{Flat252}$ and $L_{Flat252}$, respectively, herein. For example, the flat regions 252 and 254 may extend in the axial direction for at least 10% of the length L of the body 200, such as at least 15%, at least 20%, at least 25%, at least 30%, at least 35%, at least 40%, at least 45%, at least 50%, at least 55%, at least 60%, at least 65%, or at least 70% of the length L of the body 200. In a particular example, the flat regions 252 and 254 may extend in the axial direction for the entire length L of the body 200. In a further example, the flat regions 252 and 254 may extend in the axial direction for at most 90% of the length L of the body 200, such as at most 85%, at most 80%, at most 75%, at most 70%, at most 65%, at most 60%, or at most 55% of the length L of the body 200. In a further example, the flat regions 252 and 254 may extend for an entire length L of the body 200. Moreover, the flat regions 252 and 254 may extend in the axial direction for a length that is in a range including any of the minimum and maximum values noted herein. In another embodiment, the flat regions 252 and 254 may include a different length. For example, a difference between $L_{Flat252}$ and $L_{Flat252}$ may be at least 0.5% of the smaller of $L_{Flat252}$ and $L_{Flat252}$ and not greater than 70% of the greater of $L_{Flat252}$ and $L_{Flat252}$. In a further embodiment, the flat regions 252 and 254 may be in abutting contact for the entire length of one or both of the flat regions 252 and 254. In a particular embodiment, the inner portion 204 and outer portion 202 can be in abutting contact for the entire surface area of the inner surface 222 of the outer portion 202, the outer surface 224 of the inner portion 204, or both.

Figure 3A:
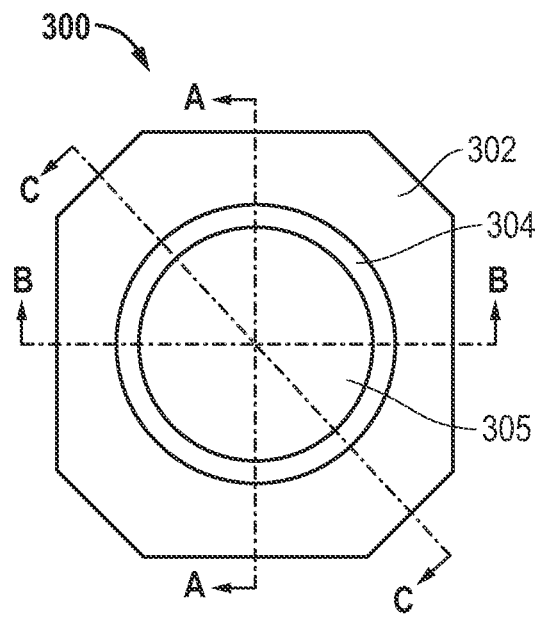
FIG. 3A includes a side view illustration of a refractory article according to an embodiment.
Figure 3B:
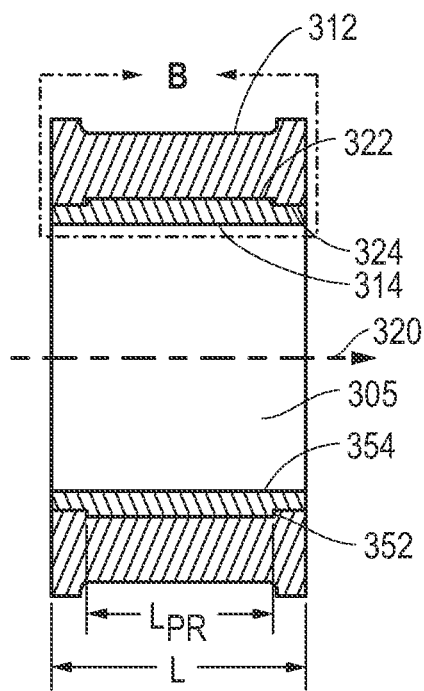
FIG. 3B includes a cross-sectional illustration of a portion of the refractory article of FIG. 3A.
Figure 3C:
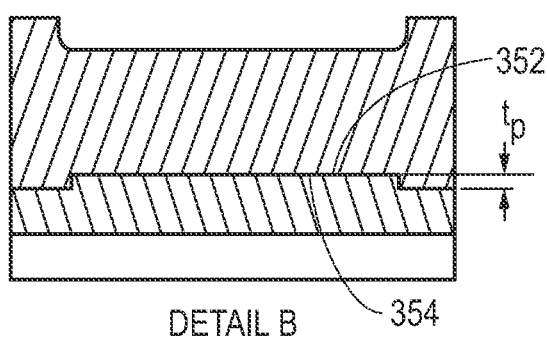
FIG. 3C includes an illustration of a magnified view of a portion of the a refractory article of FIG. 3B.

FIG. 3A includes an illustration of a side view of another exemplary bearing block according to an embodiment, including a body 300. FIG. 3B includes an illustration of section A-A of the body 300. FIG. 3C includes a magnified view of a portion of the section B-B, of the body 300. The body 300 can include an outer portion 302, an inner portion 304 coupled to the outer portion 302, and the central bore 305 enclosed by the inner portion 304.

The outer surface 324 of the inner portion 304 and the inner surface 322 of the outer portion 302 can include complementary structures that may facilitate the coupling of the inner and outer portions 302 and 304. As illustrated in FIGS. 3B and 3C, the outer surface 324 of the inner portion 304 may include a protruding portion, such as a protrusion 354, extending away from the central bore 305, and the inner surface 322 of the outer portion 302 can include complementary a receding portion, such as a recess 352 configured to receive the protrusion 354, extending toward the exterior surface and/or into the inner surface 322 of the outer portion 302. The body 300 may otherwise include similar features described with respect to the body 200 illustrated in FIGS. 2A to 2E.

In an embodiment, the recess 352 and protrusion 354 may have a same particular length $L_{PR}$, extending in the axial direction, as illustrated in FIG. 3B, which may facilitate improved coupling of the inner portion 304 and the outer portion 302 and performance of the bearing block. For example, the length $L_{PR}$ of the recess and protrusion 352 and 354 can extend for at least 10% of the length L of the body 300, at least 13%, at least 16%, at least 20%, at least 30%, at least 40%, at least 50%, at least 60%, at least 65%, or at least 70% of the length L of the body 300. In a further example, the length $L_{PR}$ of the recess and protrusion 352 and 354 may extend for the entire length L of the body. In still another example, the length $L_{PR}$ of the recess and protrusion 352 and 354 may be less than the length L of the body, such as at most 95% of the length L of the body 300, at most 90%, at most 85%, at most 80%, at most 70%, at most 60%, at most 50%, at most 40%, or at most 30% of the length L of the body 300. Moreover, the length $L_{PR}$ of the recess and protrusion 352 and 354 may be in a range including any of the minimum and maximum values noted herein. In an embodiment, the length $L_{PR}$ of the recess and protrusion 352 and 354 may be different.

In an embodiment, the 352 and protrusion 354 may have extend for a similar or same circumferential length, CPR, that may facilitate improved coupling of the inner portion 304 and the outer portion 302 and performance of the bearing block. For example, the length CPR of the recess and protrusion 352 and 354 can extend for at least 0.5% of the circumference of the central bore 305, at least 1%, at least 2%, at least 3%, at least 4%, at least 5%, at least 6%, at least 7%, at least 8%, or at least 9% of the length L of the body 300. In a further example, the length CPR of the recess and protrusion 352 and 354 may extend for the entire circumference of the central bore 305. In still another example, the length CPR of the recess and protrusion 352 and 354 may be less than the circumference of the central bore 305, such as at most 90% of the circumference of the central bore 305, at most 80%, at most 70%, at most 60%, at most 50%, at most 40%, at most 30%, at most 20%, at most 10%, or at most 5% of the circumference of the central bore 305. Moreover, the length CPR of the recess and protrusion 352 and 354 may be in a range including any of the minimum and maximum values noted herein. In an embodiment, the length CPR of the recess and protrusion 352 and 354 may be different.

Figure 3D:
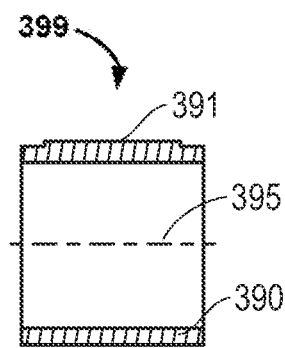
FIG. 3D includes an illustration of a magnified view of a portion of the refractory article of FIG. 3A.

In an embodiment, the body of the bearing block can include a plurality of complementary structures. As illustrated in FIG. 3B, in the cross section of A-A, two pairs of protrusions and recesses 354 and 352 are formed at opposite sides of the central bore 305. In a particular instance, the pairs may be symmetrical about the central axis 320 of the bearing body. Alternatively or additionally, the body can include a plurality of matching flat regions, and in particular instances, the pairs of matching flat regions may be symmetrical about the central axis of the body of the bearing block. In another embodiment, the body can include one or more pairs of complementary structures including asymmetrically distributed pairs. Referring to FIG. 3D, an exemplary bearing block 399 is illustrated in including a pair of matching protrusion and recess 391. The bearing block 399 may not include a matching pair of recess and protrusion opposite the pair 391 across the central bore 395.

In a further embodiment, as illustrated in FIG. 3C, the recess and protrusion 352 and 354 may include a same particular thickness $t_{PR}$ extending in the radial direction, which may facilitate improved coupling of the inner portion 304 and the outer portion 302 and performance of the bearing block. For example, the thickness $t_{PR}$ may extend in the radial direction for at least 5% of the thickness ty of the inner portion 304, such as at least 10%, at least 15%, at least 20%, or at least 25% of the thickness of the inner portion 304. In another example, the thickness $t_{PR}$ may be at most 70% of the thickness of the inner portion, at most 60%, at most 50%, at most 40%, at most 30%, or at most 25% of the thickness ty of the inner portion 304. Moreover, the thickness $t_{PR}$ of the recess and protrusion 352 and 354 may be in a range including any of the minimum and maximum values noted herein.

In a particular embodiment, the inner portion (e.g., 204 illustrated in FIGS. 2A to 2E and 304 illustrated in FIGS. 3A to 3C) and outer portion (e.g., 202 illustrated in FIGS. 2A to 2E and 302 illustrated in FIGS. 3A to 3C) may be interlocked in the radial direction, in the axial direction, in the circumferential direction, or any combination thereof. In another embodiment, the inner portion (e.g., 204 illustrated in FIGS. 2A to 2E and 304 illustrated in FIGS. 3A to 3C) may be bonded to the outer portion (e.g., 202 illustrated in FIGS. 2A to 2E and 302 illustrated in FIGS. 3A to 3C). For example, the inner portion may be sintered or otherwise bonded to the outer portion.

Turning to FIG. 2A, as illustrated, the exterior surface 212 can include a plurality of side surfaces 201. In the illustrated particular embodiment, the body 200 may have a general octagonal shape, which can be defined by the exterior surface 212. A skilled artisan will appreciate that the body 200 or 300 may be formed in shapes that are suitable for applications of the bearing block. For example, the body 200 or 300 may take a polygonal shape different than an octagon, such as a cube, a triangle, a hexagon, a rectangle, or another shape. In another example, the body 200 may have a cylindrical shape. In another embodiment, the exterior surface may include at least 1 face, such as at least 3, at least 4, at least 5, at least 6 or at least 8 faces.

Figure 2D:
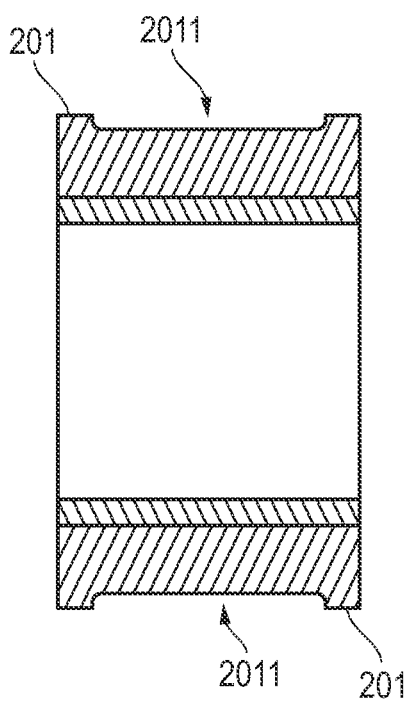
Figure 2E:
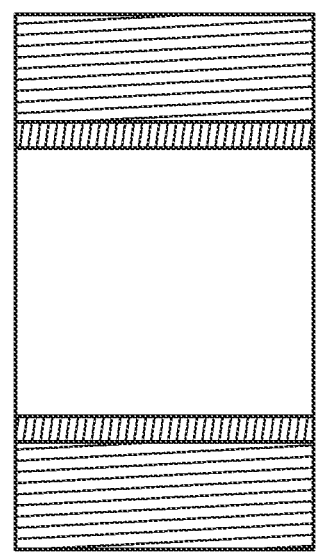

In an embodiment, the exterior surface 212 may include recessed regions. FIG. 2D includes an illustrations of section A-A of the body 200 illustrated in FIG. 2A, in which the opposite side surfaces 201 include recessed regions 2011. The recessed regions 2011 can facilitate positioning the bearing block. For example, the recessed region 2011 may help attachment of the bearing block to another fixture or mounting equipment or another structure in applications of the bearing block. FIG. 2E includes an illustration of section C-C of the body 200 illustrated in FIG. 2A, in which recessed regions are not formed the side surfaces 201. After reading this disclosure, a skilled artisan will appreciate surface features, such as recessed regions 2011 or another feature, can be formed on the exterior surface 212, such as one or more or all of the side surfaces, as desired by applications of the bearing block.

In an embodiment, the outer portion, 202 in FIG. 2A and 302 in FIG. 3A, can include a first ceramic material. For instance, the exterior surface 212 in FIG. 2B and 312 in FIG. 3B, and the inner circumferential surface 222 of the outer portion 202 in FIGS. 2A and 2B and 322 of the outer portion 302 in FIGS. 3A and 3B, may be defined by the first ceramic material. In a particular embodiment, the outer portion may consist essentially of the first ceramic material.

In an embodiment, the outer portion may include grains of the first ceramic material. In another embodiment, the first ceramic material can include grains. In an aspect, the grains may include fine grains, coarse grains, or any combination thereof. For example, the first ceramic material can include fine grains and coarse grains. In a particular example, the first ceramic material may include a greater content of coarse grains than fine grains. In a further aspect, the grains may include a particular grain size distribution that may facilitate improved property and/or performance of the bearing block. In particular examples, the first ceramic material may include grains having a multi-modal distribution.

In a further embodiment, the first ceramic material can include fine grains having particular grain sizes and coarse grains having particular grain sizes. In an aspect, the first ceramic material can include fine grains having grain sizes in a range from 0.1 microns to 10 microns. In another aspect, the first ceramic material may include coarse grains having grain sizes greater than 10 microns, such as at least 15 microns or at least 20 microns. In instances, the coarse grain may have grain sizes up to 1500 microns or higher, such as at most 2000 microns or at most 3000 microns. In a particular aspect, the first ceramic material may include a first type of coarse grains having grain sizes in a range from 150 microns to 1500 microns and a second type of coarse grains having grain sizes in a range from 20 microns to 150 microns.

In an embodiment, the outer portion may include a particular content of the first type of coarse grains that can facilitate improved property and performance of the bearing block. For example, the first type of coarse grains may be in a content of at least 10 wt % for the total weight of the outer portion, such as at least at least 16 wt %, at least 21 wt %, at least 24 wt %, at least 29 wt %, at least 34 wt %, at least 37 wt %, at least 43 wt %, at least 49 wt %, at least 51 wt %, at least 57 wt %, at least 63 wt %, at least 66 wt %, at least 69 wt %, at least 72 wt %, at least 75 wt %, or at least 80 wt % for a total weight of the outer portion. In another example, the outer portion may include at most 87 wt % of the first type of coarse grains, such as at most 82 wt %, at most 79 wt %, at most 77 wt %, at most 73 wt %, at most 71 wt %, at most 69 wt %, at most 67 wt %, at most 62 wt %, at most 60 wt %, or at most 58 wt % of the first type of coarse grains for the total weight of the outer portion. Moreover, the content of the first type of coarse grains may be in a range including any of the minimum and maximum percentages noted herein. For example, the first type of the coarse grains may be in a content in a range including at least 10 wt % and at most 80 wt % or in a range including at least 34 wt % and at most 77 wt % or in a range including at least 51 wt % and at most 71 wt % for the total weight of the outer portion.

In an embodiment, the outer portion may include a particular content of the second type of coarse grains that can facilitate improved property and performance of the bearing block. For example, the second type of coarse grains may be in a content of at least 2 wt % for the total weight of the outer portion, such as at least 5 wt %, at least 7 wt %, at least 11 wt %, at least 14 wt %, at least 16 wt %, at least 19 wt %, at least 21 wt %, at least 24 wt %, or at least 25 wt % for a total weight of the outer portion. In an other example, the outer portion may include at most 49 wt % of the second type of coarse grains for the total weight of the outer portion, such as at most 47 wt %, at most 43 wt %, at most 39 wt %, at most 36 wt %, at most 33 wt %, at most 29 wt %, at most 27 wt %, at most 23 wt %, at most 21 wt %, at most 19 wt %, or at most 18 wt % of the second type of coarse grains for the total weight of the outer portion. Moreover, the content of the second type of coarse grains may be in a range including any of the minimum and maximum percentages noted herein. For example, the second type of the coarse grains may be in a content in a range including at least 2 wt % and at most 49 wt % or in a range including at least 7 wt % and at most 33 wt % or in a range including at least 11 wt % and at most 27 wt % for the total weight of the outer portion.

In an embodiment, the outer portion may include a particular content of fine grains that can facilitate improved property and performance of the bearing block. For example, the fine grains may be in a content of at least 1 wt % for the total weight of the outer portion, such as at least 3 wt %, at least 5 wt %, at least 7 wt %, at least 11 wt %, at least 14 wt %, at least 16 wt %, at least 19 wt %, or at least 21 wt % for a total weight of the outer portion. In an other example, the outer portion may include at most 43 wt % of the fine grains for the total weight of the outer portion, such as at most 41 wt %, at most 36 wt %, at most 33 wt %, at most 31 wt %, at most 29 wt %, at most 27 wt %, at most 23 wt %, at most 21 wt %, at most 19 wt %, at most 18 wt %, or at most 17 wt % of the fine grains for the total weight of the outer portion.

Moreover, the content of the fine grains may be in a range including any of the minimum and maximum percentages noted herein. For example, the fine grains may be in a content in a range including at least 3 wt % and at most 43 wt % or in a range including at least 7 wt % and at most 31 wt % or in a range including at least 11 wt % and at most 23 wt % for the total weight of the outer portion.

In an embodiment, the first ceramic material can include a carbide. For example, the outer portion may include silicon carbide (SiC). In a particular example, the first material may consist essentially of a carbide. In a more particular example, the first material may consist essentially of SiC. In another embodiment, the first material may include at least one material from the group of oxygen, nitrogen, compounds (e.g., oxides or nitrides) or any combination thereof. In an example, the first material may include oxide, nitride, or a combination thereof. In another example, the first material may include oxynitride, oxide, nitride, carbide, or a combination thereof. A further example of the first material may include a material including nitride-bonded carbide or oxynitride-bonded carbide. In a particular example, the first material may consist essentially of nitride-bonded carbide or oxynitride-bonded carbide. In a more particular example, the first material may include nitride-bonded SiC, oxynitride-bonded SiC. In an even more particular example, the first material may consist essentially of nitride-bonded SiC or oxynitride-bonded SiC.

In another embodiment, the first material may be multi-phasic. For example, the first material may include a phase including carbide and another phase including nitrogen, compounds thereof, or any combination thereof.

In a further embodiment, the outer portion may include the first material including a primary phase and a secondary phase. The primary phase may be present in a greater content (wt %) compared to the secondary phase. For example, the primary phase may be at least 51 wt % of a total weight of the outer portion, such as at least 55 wt %, at least 60 wt %, at least 65 wt %, at least 68 wt %, at least 70 wt %, at least 73 wt %, or at least 75 wt % of the total weight of the outer portion. In another instance, the primary phase may be at most 95 wt % of a total weight of the outer portion, at most 90 wt %, at most 85 wt %, at most 80 wt %, or at most 75 wt % of the total weight of the outer portion. Moreover, the content of the primary phase may be in a range including any of the minimum and maximum percentages noted herein.

In an embodiment, the first material may include a primary phase including carbide. In another embodiment, the outer portion can include SiC in the primary phase and in a particular content that may facilitate improved property and/or performance of the bearing block. For example, the outer portion may include a content of SiC of at least 51 wt % for the total weight of the outer portion, such as at least 55 wt %, at least 60 wt %, at least 65 wt %, at least 68 wt %, at least 70 wt %, at least 73 wt %, or at least 75 wt % of the total weight of the outer portion. In another instance, SiC may be present in a content of at most at most 95 wt % of a total weight of the outer portion, such as at most 90 wt %, at most 85 wt %, at most 80 wt %, or at most 75 wt % of the total weight of the outer portion. Moreover, the content of SiC may be in a range including any of the minimum and maximum percentages noted herein.

In a further embodiment, the first material may include grains including carbide. In still another embodiment, the outer portion may include SiC grains, wherein the SiC grains can be present in the primary phase. In particular examples, the primary phase may consist essentially of SiC grains.

In an embodiment, the primary phase can include grains having a multi-modal grain size distribution including the fine grains, the first type of coarse grains, and the second type of coarse grains described in embodiments herein with respect to the outer portion. In a further embodiment, the outer portion can include SiC grains having the multi-model distribution, wherein the SiC grains can be in the primary phase of the first material. In an aspect, the first type of coarse grains can include SiC grains. In a further aspect, a majority of the SiC grains can include the grain sizes of the first type of coarse grains. In a further aspect, the first type of coarse grains may consist essentially of SiC grains.

In a particular embodiment, the outer portion may include SiC grains that are the first type of coarse grains in a particular content of that can facilitate improved property and/or performance of the bearing block. In an example, at least 50 wt % of the SiC grains for a total weight of the SiC grains can make up the first type of coarse grains, at least 55 wt %, at least 60 wt %, at least 63 wt %, or at least 66 wt % of the SiC grains for the total weight of the SiC grains can make up the first type of coarse grains. In another example, at most 85 wt % of the SiC grains for the total weight of the SiC grains can make up the first type of coarse grains, such as at most 82 wt %, at most 78 wt %, at most 75 wt %, or at most 70 wt %, or at most 67 wt % of the SiC grains for the total weight can make up the first type of coarse grains. Moreover, the SiC grains that make up the first type of coarse grains can have a content in a range including any of the minimum and maximum percentages noted herein. In a particular implementation, approximately $2/3^{rd}$ of the total weight of the SiC grains may be the first type of coarse grains.

In an embodiment, the primary phase can include the second type of coarse grains. In an aspect, the second type of coarse grains can include SiC grains. In a further aspect, the second type of coarse grains may consist essentially of SiC grains.

In another embodiment, the outer portion may include SiC grains having the grain sizes of the second type of abrasive grains. In an aspect, the second type of coarse grains may consist essentially of SiC grains. In another aspect, the out portion may include a particular content of SiC grains that are the second type of coarse grains to facilitate improved property and/or performance of the bearing block. In an example, at least 10 wt % of the SiC grains for a total weight of the SiC grains can be the second type of coarse grains, such as at least 11 wt %, at least 12 wt %, or at least 13 wt % of the SiC grains for a total weight of the SiC grains can be the second type of coarse grains. In another example, at most 25 wt % of the SiC grains for the total weight of the SiC grains can be the second type of coarse grains, such as at most 22 wt %, at most 20 wt %, at most 18 wt %, at most 17 wt %, or at most 16.5 wt % for the total weight of the SiC grains may be the second type of coarse grains. Moreover, the SiC grains that make up the second type of coarse grains can have a content in a range including any of the minimum and maximum percentages noted herein. In a particular implementation, approximately $1/6^{th}$ of the total weight of the SiC grains may be the second type of coarse grains.

In an embodiment, the primary phase can include the fine grains. In an aspect, the fine grains can include SiC grains. In a further aspect, the fine grains may consist essentially of SiC grains.

In another embodiment, the outer portion may include SiC grains having the grain sizes of the fine grains. In an aspect, the fine grains may consist essentially of SiC grains. In another aspect, the outer portion may include a particular content of SiC grains that are the fine grains to facilitate improved property and/or performance of the bearing block. In an example, at least 10 wt % of the SiC grains for a total weight of the SiC grains can be the fine grains, such as at least 11 wt %, at least 12 wt %, or at least 13 wt % of the SiC grains for a total weight of the SiC grains can be the fine grains. In another example, at most 25 wt % of the SiC grains for the total weight of the SiC grains can be the fine grains, such as at most 22 wt %, at most 20 wt %, at most 18 wt %, at most 17 wt %, or at most 16.5 wt % for the total weight of the SiC grains can be the fine grains. Moreover, the SiC grains that make up the fine grains can have a content in a range including any of the minimum and maximum percentages noted herein. In a particular implementation, approximately $1/6^{th}$ of the total weight of the SiC grains may be the fine grains.

In an embodiment, the first material may include a particular content of the secondary phase. In an example, the secondary phase may be at least 10 wt % of a total weight of the outer portion, at least 12 wt %, at least 15 wt %, at least 18 wt %, at least 20 wt %, or at least 23 wt % of a total weight of the outer portion. In another example, the second phase is at most 49 wt % of a total weight of the outer portion, at most 43 wt %, at most 40 wt %, at most 37 wt %, at most 33 wt %, at most 30 wt %, at most 27 wt %, or at most 25 wt % of the total weight of the outer portion. Moreover, the content of the secondary phase may be in a range including any of the minimum and maximum percentages noted herein.

In an embodiment, the secondary phase can include a material including oxygen, nitrogen, compounds thereof or any combination thereof. In an example, the secondary phase may comprise a nitride, an oxide, or any combination thereof. In a particular example, the secondary phase may consist essentially of nitride or oxide. In another particular example, the secondary phase consists essentially of nitride and oxide. A more particular example of the secondary phase may include silicon nitride, silicon oxynitride, or a combination thereof. In an even more particular example, the secondary phase may consist essentially of at least one material selected from silicon nitride and silicon oxynitride.

In a further embodiment, the outer portion may include nitride in the secondary phase of the first material. In a particular example, essentially all nitride may be present in the secondary phase. In another embodiment, the secondary phase may include a particular content of nitride to facilitate improved property and/or performance of the bearing block.

For example, the secondary phase may comprise at least 51 wt % of nitride for a total weight of the secondary phase, such as at least 60 wt %, at least 70 wt %, at least 80 wt %, or at least 90 wt % for a total weight of the secondary phase. In another instance, the secondary phase may comprise at most 99 wt % of a nitride for a total weight of the secondary phase, such as at most 97 wt %, at most 95 wt %, at most 92 wt % of a nitride for the total weight of the secondary phase. Moreover, the secondary phase may include a content of nitride in a range including nay of the minimum and maximum percentages noted herein.

In a further embodiment, the outer portion may include oxide in the secondary phase of the first material. In a particular example, essentially all oxide may be present in the secondary phase. In another embodiment, the secondary phase may include a particular content of oxide that may facilitate improved property and/or performance of the bearing block. For example, the secondary phase may comprise at least 0.5 wt % of oxide for a total weight of the secondary phase, at least 0.7 wt %, at least 1 wt %, at least 3 wt %, at least 5 wt %, or at least 8 wt % of the oxide for a total weight of the secondary phase. In another instance, the secondary phase may comprise at most 20 wt % of oxide for a total weight of the second phase, at most 18 wt %, at most 16 wt %, at most 14 wt %, at most 12 wt %, at most 10 wt %, or at most 8 wt % of the oxide for the total weight of the secondary phase. Moreover, the secondary phase may include a content of oxide in a range including any of the minimum and maximum percentages noted herein.

In a particular embodiment, the outer portion can may comprise nitride-bonded silicon carbide, and more specifically, may consist essentially of nitride-bonded silicon carbide. In another embodiment, the outer portion may include an oxynitride-bonded silicon carbide, and more particularly, the outer portion may consist essentially of oxynitride-bonded silicon carbide. In yet another embodiment, the outer portion may consist essentially of silicon carbide.

In an embodiment, the outer portion may include a particular content of silicon nitride ($Si_3N_4$) that may facilitate improved property and/or performance of the bearing block. In an example, the outer portion may include at least 10 wt % of silicon nitride for a total weight of the outer portion, such as at least 12 wt %, at least 15 wt %, at least 18 wt %, at least 20 wt %, or at least 23 wt % of a total weight of the outer portion. In another example, the content of silicon nitride may be at most 47 wt % of a total weight of the outer portion, at most 43 wt %, at most 40 wt %, at most 37 wt %, at most 33 wt %, at most 30 wt %, at most 27 wt %, or at most 25 wt % for the total weight of the outer portion. Moreover, the content of silicon nitride may be in a range including any of the minimum and maximum percentages noted herein.

In an embodiment, the outer portion may include a particular content of silicon oxynitride ($SiO_xN_y$) that may facilitate improved property and/or performance of the bearing block. In an example, the outer portion may include at least 10 wt % of silicon oxynitride for a total weight of the outer portion, such as at least 12 wt %, at least 15 wt %, at least 18 wt %, at least 20 wt %, or at least 23 wt % of a total weight of the outer portion. In another example, the content of silicon oxynitride may be at most 47 wt % of a total weight of the outer portion, at most 43 wt %, at most 40 wt %, at most 37 wt %, at most 33 wt %, at most 30 wt %, at most 27 wt %, or at most 25 wt % for the total weight of the outer portion. Moreover, the content of silicon oxynitride may be in a range including any of the minimum and maximum percentages noted herein.

In an embodiment, the inner portion, 204 in FIG. 2A and 304 in FIG. 3A, may include a second ceramic material. For instance, the interior surface 214 in FIG. 2B and 314 in FIG. 3B, and the outer circumferential surface, 222 of the inner portion 204 in FIGS. 2A and 2B and 322 of the inner portion 304 in FIGS. 3A and 3B, may be defined by the second ceramic material. The second ceramic material may define the central bore, 205 in FIG. 2A and 305 in FIG. 3A. In a particular embodiment, the inner portion may consist essentially of the second ceramic material.

In an embodiment, the first and second ceramic materials can include a different characteristic including compositions, grain size distributions, grain sizes, properties, or any combination thereof. In particular, the one or more differences between the first and second ceramic materials may facilitate improved properties and/or performance of the bearing block.

In an embodiment, the second ceramic material can include grains having a different grain size distribution than the first ceramic material. In a further embodiment, the second ceramic material may include particular grain size distribution that may facilitate improved properties and/or performance of the bearing block. In an aspect, the second ceramic material may include fine grains, coarse grains, or any combination thereof. For example, the second ceramic material can include fine grains and coarse grains. In another aspect, the second ceramic material may include grains having a multi-model distribution. In a particular example, the second ceramic material may include grains having a bi-model grain size distribution.

In an embodiment, the second ceramic material can include fine grains having particular grain sizes and coarse grains having particular grain sizes. In an aspect, the second ceramic material can include fine grains having grain sizes in a range from 0.1 microns to 10 microns. In another aspect, the second ceramic material may include coarse grains having grain sizes greater than 10 microns, such as at least 15 microns or at least 20 microns. In instances, the coarse grain may have grain sizes up to 150 microns. In a particular aspect, the second ceramic material may comprise coarse grains having grain sizes in a range from 20 microns to 150 microns.

In an embodiment, the inner portion may include a particular content of the coarse grains that can facilitate improved property and performance of the bearing block. For example, the coarse grains may be in a content of at least 15 wt % for the total weight of the inner portion, such as at least at least 18 wt %, at least 21 wt %, at least 24 wt %, at least 29 wt %, at least 34 wt %, at least 37 wt %, at least 43 wt %, at least 47 wt %, at least 49 wt %, or at least 51 wt % for a total weight of the inner portion. In another example, the inner portion may include at most 75 wt % of the coarse grains for a total weight of the inner portion, such as at most 72 wt %, at most 71 wt %, at most 69 wt %, at most 67 wt %, at most 62 wt %, at most 60 wt %, at most 58 wt %, at most 55 wt %, at most 53 wt %, or at most 51 wt % of the coarse grains for the total weight of the inner portion. Moreover, the content of the coarse grains may be in a range including any of the minimum and maximum percentages noted herein. For example, the coarse grains may be in a content in a range including at least 10 wt % and at most 75 wt % or in a range including at least 24 wt % and at most 62 wt % or in a range including at least 31 wt % and at most 55 wt % for the total weight of the inner portion.

In an embodiment, the inner portion may include a particular content of fine grains that can facilitate improved property and performance of the bearing block. For example, the fine grains may be in a content of at least 25 wt % for the total weight of the inner portion, such as at least 31 wt %, at least 34 wt % at least 38 wt %, at least 42 wt %, at least 44 wt %, at least 46 wt %, or at least 50 wt % for a total weight of the outer portion. In an other example, the inner portion may include at most 85 wt % of the fine grains for the total weight of the inner portion, such as at most 81 wt %, at most 76 wt %, at most 73 wt %, %, at most 71 wt %, at most 67 wt %, at most 63 wt %, at most 59 wt %, at most 54 wt %, at most 52 wt %, or at most 50 wt % of the fine grains for the total weight of the outer portion. Moreover, the content of the fine grains may be in a range including any of the minimum and maximum percentages noted herein. For example, the fine grains may be in a content in a range including at least 25 wt % and at most 85 wt % or in a range including at least 34 wt % and at most 71 wt % or in a range including at least 42 wt % and at most 57 wt % for the total weight of the inner portion. In a particular implementation, the second ceramic material may include approximately 50 wt % of fine grains and approximately 50 wt % of the fine grains.

In an embodiment, the second ceramic material can include a carbide. For example, the inner portion may include silicon carbide (SiC). In another embodiment, the second material may include at least one material from the group of oxygen, nitrogen, compounds (e.g., oxides or nitrides) or any combination thereof. In an example, the second material may include oxide, nitride, or a combination thereof. In another example, the second material may include oxynitride, oxide, nitride, carbide, or a combination thereof. A further example of the second material may include a material including nitride-bonded carbide or oxynitride-bonded carbide. In a particular example, the second material may consist essentially of nitride-bonded carbide. In another particular example, the second material may consist essentially of oxynitride-bonded carbide. In a more particular example, the second material may include nitride-bonded SiC, oxynitride-bonded SiC, or any combination thereof. In an even more particular example, the second material may consist essentially of nitride-bonded SiC or oxynitride-bonded SiC.

In another embodiment, the second material may be multi-phasic. For example, the second material may include a phase including carbide and another phase including oxygen, nitrogen, compounds thereof or any combination thereof.

In a further embodiment, the inner portion may include the second material including a primary phase and a secondary phase. The primary phase may be present in a greater content (wt %) compared to the secondary phase. For example, the primary phase may be at least 51 wt % of a total weight of the outer portion, such as at least 55 wt %, at least 60 wt %, at least 65 wt %, at least 68 wt %, at least 70 wt %, or at least 73 wt % of the total weight of the inner portion. In another instance, the primary phase may be at most 90 wt % of a total weight of the inner portion, at most 85 wt %, at most 80 wt %, at most 75 wt %, or at most 70 wt % of the total weight of the inner portion. Moreover, the content of the primary phase may be in a range including any of the minimum and maximum percentages noted herein.

In an embodiment, the second material may include a primary phase including carbide. In another embodiment, the inner portion can include SiC in the primary phase and in a particular content that may facilitate improved property and/or performance of the bearing block. For example, the inner portion may include a content of SiC of at least 51 wt % for the total weight of the outer portion, such as at least 55 wt %, at least 60 wt %, at least 65 wt %, at least 68 wt %, at least 70 wt %, at least 73 wt %, or at least 75 wt % of the total weight of the inner portion. In another instance, SiC may be present in a content of at most at most 90 wt % of a total weight of the inner portion, such as at most 85 wt %, at most 80 wt %, at most 75 wt %, or at most 70 wt % of the total weight of the inner portion. Moreover, the content of SiC may be in a range including any of the minimum and maximum percentages noted herein.

In a further embodiment, the second material may include grains including carbide. In still another embodiment, the outer portion may include SiC grains, wherein the SiC grains can be present in the primary phase. In particular examples, the primary phase may consist essentially of SiC grains.

In an embodiment, the primary phase can include grains having a multi-model grain size distribution including the fine grains and the coarse grains described in embodiments herein with respect to the inner portion. In a further embodiment, the outer portion can include SiC grains having the multi-model distribution. In an aspect, the coarse grains can include SiC grains. In a further aspect, the coarse grains may consist essentially of SiC grains. In a further aspect, the fine grains may include SiC grains. In a particular example, the fine grains may consist essentially of SiC grains.

In an embodiment, the inner portion may include a particular content of SiC grains that are the coarse grains to facilitate improved property and/or performance of the bearing block. In an example, at least 15 wt % of the SiC grains for a total weight of the SiC grains can be the coarse grains, such as at least at least 18 wt %, at least 21 wt %, at least 24 wt %, at least 29 wt %, at least 34 wt %, at least 37 wt %, at least 43 wt %, at least 47 wt %, at least 49 wt %, or at least 51 wt % of the SiC grains for a total weight of the inner portion can be coarse grains. In another example, at most 75 wt % of the SiC grains for a total weight of the SiC grains can be the coarse grains, such as, at most 72 wt %, at most 71 wt %, at most 69 wt %, at most 67 wt %, at most 62 wt %, at most 60 wt %, at most 58 wt %, at most 55 wt %, at most 53 wt %, or at most 51 wt % of the SiC grains for the total weight of the SiC grains can be the coarse grains. Moreover, the content of the coarse grains may be in a range including any of the minimum and maximum percentages noted herein. Moreover, the SiC grains that make up the coarse grains can have a content in a range including any of the minimum and maximum percentages noted herein. For example, the content of the SiC grains that make up the coarse grains may be in a in a range including at least 10 wt % and at most 75 wt % or in a range including at least 24 wt % and at most 62 wt % or in a range including at least 31 wt % and at most 55 wt % for the total weight of the SiC grains. In a particular implementation, approximately half of the total weight of the SiC grains may be the coarse grains.

In another embodiment, the inner portion may include SiC grains having the grain sizes of the fine grains. In an aspect, the fine grains may consist essentially of SiC grains. In another aspect, the inner portion may include a particular content of SiC grains that are the fine grains to facilitate improved property and/or performance of the bearing block. In an example, at least 25 wt % of the SiC grains for a total weight of the SiC grains can be the fine grains, such as at least 31 wt %, at least 34 wt %, at least 38 wt %, at least 42 wt %, at least 44 wt %, at least 46 wt %, or at least 50 wt % of the total weight of the SiC grains can be fine grains. In an other example, at most 85 wt % of the SiC grains for the total weight of the SiC grains can be the fine grains, such as at most 81 wt %, at most 76 wt %, at most 73 wt %, at most 71 wt %, at most 67 wt %, at most 63 wt %, at most 59 wt %, at most 54 wt %, at most 52 wt %, or at most 50 wt % of the SiC grains can be the fine grains. Moreover, the content of the SiC grains that are the fine grains may be in a range including any of the minimum and maximum percentages noted herein. For example, the SiC grains that are the fine grains may be in a content in a range including at least 25 wt % and at most 85 wt % or in a range including at least 34 wt % and at most 71 wt % or in a range including at least 42 wt % and at most 57 wt % for the total weight of the inner portion. In a particular implementation, the second ceramic material may include SiC grains, wherein approximately 50 wt % of the SiC grains can be the fine grains and approximately 50 wt % of the SiC grains that are coarse grains.

In an embodiment, the second material may include a particular content of the secondary phase. In an example, the secondary phase may be at least 10 wt % of a total weight of the inner portion, such as at least 12 wt %, at least 15 wt %, at least 18 wt %, at least 20 wt %, at least 25 wt %, or at least 30 wt % of a total weight of the inner portion. In another example, the second phase may be at most 49 wt % of a total weight of the inner portion, such as at most 45 wt %, at most 40 wt %, at most 36 wt %, at most 33 wt %, or at most 30 wt % of the total weight of the inner portion. Moreover, the content of the secondary phase may be in a range including any of the minimum and maximum percentages noted herein.

In an embodiment, the secondary phase can include a material including oxygen, nitrogen, compounds thereof or any combination thereof. In an example, the secondary phase may comprise a nitride. In a particular example, the secondary phase may consist essentially of nitride. In another example, the secondary phase may include oxide. A more particular example of the secondary phase may include silicon nitride, silicon oxynitride, or a combination thereof. In an even more particular example, the secondary phase may consist essentially of silicon nitride.

In a particular embodiment, the inner portion can may comprise nitride-bonded silicon carbide, and more specifically, may consist essentially of nitride-bonded silicon carbide. In another embodiment, the inner portion may include an oxynitride-bonded silicon carbide, and more particularly, the inner portion may consist essentially of oxynitride-bonded silicon carbide. In yet another embodiment, the inner portion may consist essentially of silicon carbide.

In an embodiment, the inner portion may include a particular content of silicon nitride ($Si_3N_4$) that may facilitate improved property and/or performance of the bearing block. In an example, the inner portion may include at least 12 wt % of silicon nitride for a total weight of the outer portion, such as at least 15 wt %, at least 18 wt %, at least 20 wt %, at least 23 wt %, at least 26 wt %, at least 28 wt %, or at least 30 wt % for a total weight of the inner portion. In another example, the content of silicon nitride may be at most 46 wt % of a total weight of the inner portion, at most 43 wt %, at most 40 wt %, at most 37 wt %, at most 35 wt %, at most 33 wt %, or at most 30 wt % for the total weight of the outer portion. Moreover, the content of silicon nitride may be in a range including any of the minimum and maximum percentages noted herein.

In an embodiment, the inner portion may include a particular content of silicon oxynitride ($SiO_xN_y$) that may facilitate improved property and/or performance of the bearing block. In an example, the inner portion may include at least 13 wt % of silicon oxynitride for a total weight of the outer portion, such as at 15 wt %, at least 18 wt %, at least 21 wt %, at least 25 wt %, or at least 30 wt % for a total weight of the inner portion. In another example, the content of silicon oxynitride may be at most 45 wt % of a total weight of the outer portion, at most 43 wt %, at most 40 wt %, at most 37 wt %, at most 33 wt %, at most 30 wt %, or at most 27 wt % for the total weight of the inner portion. Moreover, the content of silicon oxynitride may be in a range including any of the minimum and maximum percentages noted herein.

In an embodiment, the outer portion and the inner portion may include a different property. In an aspect, the outer portion may include a different average apparent porosity than the inner portion. In a particular example, the second ceramic material may comprise a greater average apparent porosity than the first ceramic material. In another aspect, the first ceramic material may comprise a particular average apparent porosity. For example, the average apparent porosity may be at least 0.1 vol % for a total volume of the first ceramic material, such as at least 0.5 vol %, at least 1 vol %, at least 2 vol %, at least 4 vol %, at least 6 vol %, at least 8 vol %, at least 9 vol %, at least 10 vol %, or at least 12 vol %. In another instance, the first ceramic material may comprise an average apparent porosity of at most 16 vol % for a total volume of the first ceramic material, such as at most 14 vol %, at most 13 vol %, at most 11 vol %, at most 9 vol %, at most 8 vol %, at most 6 vol %, at most 5 vol %, or at most 4 vol % for a total volume of the first ceramic material. It is to be appreciated the first ceramic material may include an average apparent porosity in a range including nay of the minimum and maximum percentages noted herein. In a further aspect, the outer portion may include an average apparent porosity including any of the values or ranges noted herein with respect to the first material. In a particular aspect, the outer portion may include an average apparent porosity of not greater than 10 vol %, such as at most 8 vol %. Transparent porosity is determined according to ASTM C20-00 (2010). Average transparent porosity is the average of transparent porosity of at least 3 tested specimens.

In a further aspect, the second ceramic material may comprise a particular average apparent porosity. For example, the average apparent porosity may be at least 0.1 vol % for a total volume of the second ceramic material, such as at least 0.2 vol %, at least 0.3 vol %, at least 0.4 vol %, at least 0.6 vol %, at least 0.8 vol %, at least 1 vol %, at least 1.2 vol %, at least 1.5 vol %, or at least 1.7 vol % for a total volume of the first ceramic material. In another example, the second ceramic material may comprise an average apparent porosity of at most 5 vol % for a total volume of the second ceramic material, such as at most 4.5 vol %, at most 4 vol %, at most 3.5 vol %, at most 3 vol %, at most 2 vol %, at most 1.5 vol %, at most 1 vol %, at most 0.8 vol %, at most 0.6 vol %, at most 0.4 vol %, or at most 0.2 vol % for a total volume of the second ceramic material. In a further aspect, the inner portion may include an average apparent porosity including any values noted herein with respect to the second ceramic material. In a particular implementation, the inner portion may include an apparent porosity of at most 2 vol %, such as at most 1 vol % for the total volume of the inner portion.

In an embodiment, the first ceramic material may comprise a first co-efficient of thermal expansion, and the second ceramic material may comprise a second co-efficient of thermal expansion that is different from the first co-efficient of thermal expansion. In an aspect, the second co-efficient of thermal expansion may be greater than the first co-efficient of thermal expansion in a temperature range from 30° C. to 1500° C., which may allow the inner portion to expand at a higher rate than the outer portion in heated conditions and help prevent relative rotation between the inner and outer portions. In another aspect, the body may include a particular difference between the first and the second co-efficient of thermal expansion that may facilitate improved property and/or performance of the bearing block. For example, a difference between the first and second co-efficient of thermal expansion, $\delta_{CTE}$, may be within ±55% of the greater of the first and second co-efficient of thermal expansion in a temperature range from 30° C. to 1500° C., such as within ±50%, within ±46%, within ±40%, within ±36%, within ±30%, or within ±26% of the greater of the first and second co-efficient of thermal expansion in a temperature range from 30° C. to 1500° C. In another embodiment, the first co-efficient of thermal expansion and the second co-efficient of thermal expansion may be substantially the same. For instance, the difference between the first co-efficient of thermal expansion and the second co-efficient of thermal expansion may be within ±5% of the greater of the first and second co-efficient of thermal expansion.

In a further aspect, the first co-efficient of thermal expansion may be at least 50% of the second co-efficient of thermal expansion, such as at least 55%, at least 60%, at least 63%, at least 66%, at least 69%, at least 72%, or at least 74% of the second co-efficient of thermal expansion in a temperature range from 30° C. to 1500° C. In another aspect, the first co-efficient of thermal expansion may be at most 120% of the second co-efficient of thermal expansion, such as at most 110%, at most 100%, at most 90%, at most 87%, at most 84%, at most 81%, at most 78%, or at most 75% of the second co-efficient of thermal expansion in a temperature range from 30° C. to 1500° C. Moreover, the first co-efficient of thermal expansion may be in a range including any of the minimum and maximum values noted herein. In a particular example, the first co-efficient of thermal expansion may be at least 55% and at most 81% of the second co-efficient of thermal expansion in a temperature range from 30° C. to 1500° C. or at least 63% and at most 78% of the second co-efficient of thermal expansion in a temperature range from 30° C. to 1500° C. The co-efficient of thermal expansion is measured according to ASTM C832 (Standard Test Method of Measuring Thermal Expansion and Creep of Refractories Under Load, which will be referred to herein as the "Coefficient of Thermal Expansion" and is a valid value up to 1500° C.).

In yet another aspect, the body of the bearing block may have a particular co-efficient of thermal expansion difference between the inner portion and the outer portion that may facilitate an improvement in the performance of the bearing block. For example, the body may have an co-efficient of thermal expansion difference ($\delta_{CTE}=\delta_{CTEI}-\delta_{CTEO}$) of not greater than $3\times10^{-6}$/° C., wherein $\delta_{CTEI}$ is the coefficient of thermal expansion of the inner portion and $\delta_{CTEO}$ is the coefficient of thermal expansion of the outer portion. In other instances, the co-efficient of thermal expansion difference ($\delta_{CTE}$) may be not greater than $2.8\times10^{-6}$/C or not greater than $2.6\times10^{-6}$/° C. or not greater than $2.4\times10^{-6}$/° C. or not greater than $2.2\times10^{-6}$/° C. or not greater than $2\times10^{-6}$/° C. or not greater than 1.8 s $10^{-6}$/° C. or not greater than $1.6\times10^{-6}$/° C. or not greater than $1.4\times10^{-6}$/° C. or not greater than $1.2\times10^{-6}$/° C. or not greater than $1\times10^{-6}$/° C. In another instance, coefficient of thermal expansion difference can be at least $0.001\times10^{-6}$/° C. or at least $0.01\times10^{-6}$/° C. or at least $0.1\times10^{-6}$/° or at least $0.5\times10^{-6}$/° C. or at least $1\times10^{-6}$/° C. Moreover, the co-efficient of thermal expansion difference may be within a range including any of the minimum and maximum values noted above.

In an embodiment, the first ceramic material may include a particular first co-efficient of thermal expansion that may facilitate improved property and/or performance of the bearing block. For example, the first co-efficient of thermal expansion may be at least $1.8\times10^{-6}$ per° C. in a temperature range from 30° C. to 1500° C., such as at least $2.1\times10^{-6}$ per° C., at least $2.5\times10^{-6}$ per° C., at least $3.0\times10^{-6}$ per° C., at least $3.3\times10^{-6}$ per° C., at least $3.5\times10^{-6}$ per° C., at least $3.8\times10^{-6}$ per° C., at least $4.0\times10^{-6}$ per° C., or at least $4.3\times10^{-6}$ per° C. in the temperature range from 30° C. to 1500° C. In another example, the first ceramic material may include a first co-efficient of thermal expansion of at most $6.1\times10^{-6}$ per° C. in a temperature range from 30° C. to 1500° C., such as at most $5.8\times10^{-6}$ per° C., at most $5.3\times10^{-6}$ per° C., at most $5.0\times10^{-6}$ per° C., at most $4.7\times10^{-6}$ per° C., or at most $4.5\times10^{-6}$ per° C. in a temperature range from 30° C. to 1500° C. Moreover, the first co-efficient of thermal expansion may be in a range including any of the minimum or maximum values noted herein.

In an embodiment, the second ceramic material may include a particular second co-efficient of thermal expansion that may facilitate improved property and/or performance of the bearing block. For example, the second ceramic material may include a second co-efficient of thermal expansion of at least $1.1\times10^{-6}$ per° C., such as at least $1.4\times10^{-6}$ per° C., at least $1.8\times10^{-6}$ per° C., at least $2.2\times10^{-6}$ per° C., at least $2.5\times10^{-6}$ per° C., at least $2.7\times10^{-6}$ per° C., at least $3.0\times10^{-6}$ per° C., or at least $3.2\times10^{-6}$ per° C. in a temperature range from 30° C. to 1500° C. In another example, the second ceramic material may include a second co-efficient of thermal expansion of at most $5.2\times10^{-6}$ per° C., such as at most $4.8\times10^{-6}$ per° C. at most $4.4\times10^{-6}$° per° C., at most $4.1\times10^{-6}$ per° C., at most $3.7\times10^{-6}$ per° C., at most $3.4\times10^{-6}$ per° C., or at most $3.2\times10^{-6}$ per° C. in a temperature range from 30° C. to 1500° C. Moreover, the second co-efficient of thermal expansion may be in a range including any of the minimum or maximum values noted herein.

In an embodiment, the outer portion may include a first thermal conductivity that is different from the second thermal conductivity of the inner portion. For example, the inner portion may include a greater thermal conductivity than the outer portion at 650° C. In another aspect, the body may include a particular difference between the first and the second thermal conductivity that may facilitate improved property and/or performance of the bearing block. For example, a difference between the first and second thermal conductivity, $\delta_{TC}$, may be within ±55% of the greater of the first and second thermal conductivity at 650° C. such as within ±50%, within ±46%, within ±40%, within ±36%, or within ±30% of the greater of the first and second thermal conductivity at 650° C. In another embodiment, the first thermal conductivity and the second thermal conductivity may be substantially the same. For instance, the difference between the first thermal conductivity and the second thermal conductivity may be within ±5% of the greater of the first and second thermal conductivity.

In a further aspect, the first thermal conductivity may be at least 50% of the second thermal conductivity, such as at least 55%, at least 60%, at least 63%, at least 66%, at least 69%, at least 72%, at least 74% of the second thermal conductivity at 650° C. In another aspect, the first thermal conductivity may be at most 120% of the second thermal conductivity, such as at most 110%, at most 100%, at most 90%, at most 87%, at most 84%, at most 81%, at most 78%, or at most 75% of the second thermal conductivity at 650°

C. Moreover, the first thermal conductivity may be in a range including any of the minimum and maximum values noted herein. In a particular example, the first thermal conductivity may be at least 55% and at most 81% of the second co-efficient of thermal expansion at 650° C. or at least 63% and at most 78% of the second thermal conductivity at 650° C.

In an embodiment, the first ceramic material may include a particular first thermal conductivity that may facilitate improved property and/or performance of the bearing block. For example, the first ceramic material may have a thermal conductivity at 650° C. of at least 10 W/mK, such as at least 11 W/mK or at least 12 W/mK or at least 13 W/mK or at least 14 W/mK or at least 15 W/mK or at least 16 W/mK or at least 17 W/mK or at least 18 W/mK. In another example, the first ceramic material may have a thermal conductivity at 650° C. of not greater than 30 W/mK or not greater than 28 W/mK or not greater than 26 W/mK or not greater than 24 W/mK or not greater than 22 W/mK or not greater than 20 W/mK or not greater than 19 W/mK. Moreover, the first thermal conductivity may be in a range including any of the minimum or maximum values noted herein.

In an embodiment, the second ceramic material may include a particular second thermal conductivity that may facilitate improved property and/or performance of the bearing block. For example, the second ceramic material may have a thermal conductivity at 650° C. of at least 14 W/mK, such as at least 16 W/mK or at least 18 W/mK or at least 20 W/mK or at least 22 W/mK or at least 23 W/mK or at least 24 W/mK or at least 25 W/mK. In another example, the second ceramic material may have a thermal conductivity at 650° C. of not greater than 35 W/mK or not greater than 33 W/mK or not greater than 30 W/mK or not greater than 28 W/mK or not greater than 26 W/mK or not greater than 25 W/mK or not greater than 24 W/mK. Moreover, the second thermal conductivity may be in a range including any of the minimum or maximum values noted herein. The thermal conductivity is measured according to ASTM E1461.

In an embodiment, the outer portion may include a first Modulus of Rupture, and the inner portion may include a second Modulus of Rupture. In a particular example, the first and second Modulus of Rupture may be different. In a more particular example, the second Modulus of Rupture may be greater than the first Modulus of Rupture.

In another embodiment, the body of the bearing block may include a particular difference between the first and the second Modulus of Rupture that may facilitate improved property and/or performance of the bearing block. In an aspect, a difference between the first and second Modulus of Rupture, $\delta_{MR}$, may be within ±95% of the greater of the first and second Modulus of Rupture at 20° C., such as within ±90%, within ±86%, within ±80%, within ±76%, within ±70%, within ±62%, or within ±66% of the greater of the first and second Modulus of Rupture at 20° C.

In another aspect, a difference between the first and second Modulus of Rupture, $\delta_{MR}$, may be within ±95% of the greater of the first and second Modulus of Rupture at 1250° C. such as within ±90%, within ±86%, within ±80%, within ±76%, within ±70%, within ±66%, or within ±62% of the greater of the first and second Modulus of Rupture at 1250° C.

In another aspect, a difference between the first and second Modulus of Rupture, $\delta_{MR}$, may be within ±95% of the greater of the first and second Modulus of Rupture at 1450° C., such as within ±90%, within ±86%, within ±80%, within ±76%, within ±70%, within ±62%, or within ±60% of the greater of the first and second Modulus of Rupture at 1450° C.

In a further aspect, the first Modulus of Rupture may be at least 10% of the second co-efficient of thermal expansion at 20° C., such as at least 15%, at least 20%, at least 23%, at least 26%, at least 29%, at least 32%, at least 34%, at least 36%, at least 38%, or at least 40% of the second Modulus of Rupture at 20° C. In another aspect, the first Modulus of Rupture may be at most 90% of the second Modulus of Rupture, such as at most 85%, at most 80%, at most 75%, at most 70%, at most 66%, at most 62%, at most 58%, at most 53%, at most 50%, at most 47%, at most 45%, at most 41%, or at most 39% of the second Modulus of Rupture at 20° C. Moreover, the first Modulus of Rupture may be in a range including any of the minimum and maximum values noted herein. In a particular example, the first Modulus of Rupture may be at least 15% and at most 81% of the second Modulus of Rupture at 20° C. or at least 23% and at most 47% of the second Modulus of Rupture at 20° C.

In a further aspect, the first Modulus of Rupture may be at least 15% of the second co-efficient of thermal expansion at 1250° C., such as at least 20%, at least 23%, at least 26%, at least 29%, at least 32%, at least 34%, at least 36%, at least 38%, at least 40%, or at least 44% of the second Modulus of Rupture at 1250° C. In another aspect, the first Modulus of Rupture may be at most 90% of the second Modulus of Rupture, such as at most 85%, at most 80%, at most 75%, at most 70%, at most 66%, at most 62%, at most 58%, at most 53%, at most 50%, at most 47%, or at most 45% of the second Modulus of Rupture at 1250° C. Moreover, the first Modulus of Rupture may be in a range including any of the minimum and maximum values noted herein. In a particular example, the first Modulus of Rupture may be at least 25% and at most 66% of the second Modulus of Rupture at 1250° C. or at least 34% and at most 58% of the second Modulus of Rupture at 1250° C.

In a further aspect, the first Modulus of Rupture may be at least 14% of the second co-efficient of thermal expansion at 1450° C., such as at least 18%, at least 21%, at least 24%, at least 28%, at least 31%, at least 33%, at least 35%, at least 37%, or at least 39%, or at least 40% of the second Modulus of Rupture at 1450° C. In another aspect, the first Modulus of Rupture may be at most 90% of the second Modulus of Rupture, such as at most 85%, at most 80%, at most 75%, at most 70%, at most 66%, at most 62%, at most 58%, at most 53%, at most 50%, at most 47%, at most 45%, or at most 40% of the second Modulus of Rupture at 1450° C. Moreover, the first Modulus of Rupture may be in a range including any of the minimum and maximum values noted herein. In a particular example, the first Modulus of Rupture may be at least 18% and at most 62% of the second Modulus of Rupture at 1450° C. or at least 31% and at most 53% of the second Modulus of Rupture at 1450° C.

In an embodiment, the first ceramic material may include a particular first Modulus of Rupture that may facilitate improved property and/or performance of the bearing block. In an aspect, the first ceramic material may include a particular first Modulus of Rupture at 20° C. For example, the first ceramic material may include the first Modulus of Rupture of at most 120 MPa at 20° C., such as at most 110 MPa, at most 100 MPa, at most 90 MPa, at most 80 MPa, at most 75 MPa, or at most 70 MPa at 20° C. In another example, the first ceramic material may include a Modulus of Rupture at 20° C. of at least 50 MPa, such as at least 55 MPa, at least 60 MPa, at least 65 MPa, or at least 69 MPa.

Moreover, the first Modulus of Rupture may be in a range including any of the minimum or maximum values noted herein.

In another aspect, the first ceramic material may include a particular first Modulus of Rupture at 1250° C. For example, the first ceramic material may include a Modulus of Rupture at 1250° C. of at most 120 MPa, at most 110 MPa, at most 100 MPa, at most 90 MPa, at most 86 MPa, or at most 83 MPa. In another example, the first ceramic material may include a Modulus of Rupture at 1250° C. of at least 60 MPa, at least 65 MPa, at least 70 MPa, at least 75 MPa, or at least 80 MPa. Moreover, the first Modulus of Rupture may be in a range including any of the minimum or maximum values noted herein.

In another aspect, the first ceramic material may include a particular first Modulus of Rupture at 1450° C. For example, the first ceramic material may include of a first Modulus of Rupture of at most 110 MPa, at most 100 MPa, at most 90 MPa, at most 86 MPa, or at most 83 MPa, or at most 80 MPa. In another example, the first ceramic material may include a Modulus of Rupture at 1450° C. of at least 60 MPa, at least 65 MPa, at least 70 MPa, or at least 75 MPa. Moreover, the first Modulus of Rupture may be in a range including any of the minimum or maximum values noted herein.

In an embodiment, the second ceramic material may include a particular second Modulus of Rupture that may facilitate improved property and/or performance of the bearing block. In an aspect, the second ceramic material may include a particular second Modulus of Rupture at 20° C. For example, the second ceramic material may include a Modulus of Rupture of at most 230 MPa at 20° C., such as at most 220 MPa, at most 210 MPa, at most 200 MPa, at most 190 MPa, or at most 180 MPa at 20° C. In another example, the second ceramic material may include a Modulus of Rupture at 20° C. of at least 85 MPa, at least 90 MPa, at least 95 MPa, at least 100 MPa, at least 110 MPa, at least 120 MPa, or at least 130 MPa. Moreover, the second Modulus of Rupture may be in a range including any of the minimum or maximum values noted herein.

In an aspect, the second ceramic material may include a particular second Modulus of Rupture at 1250° C. For example, the second ceramic material may include a Modulus of Rupture of at most 240 MPa, at most 230 MPa, at most 220 MPa, at most 210 MPa, at most 200 MPa, or at most 190 MPa. In another example, the second ceramic material may include a Modulus of Rupture at 1250° C. of at least 90 MPa, at least 110 MPa, at least 130 MPa, at least 140 MPa, at least 150 MPa, or at least 160 MPa. Moreover, the second Modulus of Rupture may be in a range including any of the minimum or maximum values noted herein.

In an aspect, the second ceramic material may include a particular second Modulus of Rupture at 1450° C. For example, the second ceramic material may include a Modulus of Rupture of at most 255 MPa, at most 245 MPa, at most 230 MPa, at most 220 MPa, or at most 210 MPa, at most 200, or at most 190 MPa. In another example, the second ceramic material may include a Modulus of Rupture at 1450° C. of at least 100 MPa, at least 105 MPa, at least 110 MPa, at least 120 MPa, at least 130 MPa, at least 150 MPa, or at least 160 MPa. Moreover, the second Modulus of Rupture may be in a range including any of the minimum or maximum values noted herein.

The bearing block of the embodiments herein can be utilized in high-temperature applications and/or a corrosive environment. In at least one embodiment, the bearing block may be used in a gavanizing system. For example, the bearing block may be submerged in molten metal. The exterior surface of the body may be in contact with molten metal, and a shaft may be placed in the central bore. In particular instances, a shaft sleeve may be placed between the shaft and the interior surface of the bearing block. In more particular instances, the shaft sleeve may include a ceramic material.

Figure 4:
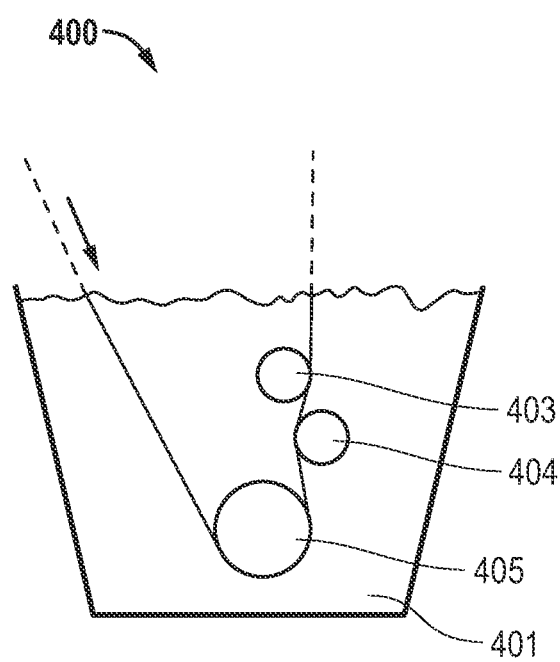
FIG. 4 includes an illustration of a system including a refractory article according to an embodiment.

FIG. 4 includes an illustration of a portion of a metal coating line 400 including a molten metal bath 401 and rollers 403 to 405 that are submerged in the bath 401. In an example, each of the rollers 402 to 404 may include two bearing blocks of embodiments herein.

The bearing block of the embodiments herein can have improved performance, which can be facilitated by grain size distributions, compositions, or both of the first and second materials. For instance, the grain size distribution of the second material, at least in part, facilitates improved wear resistance and strength of the inner portion, and the particular grain size distributions of the first material can facilitate improved powder processing, reduced porosity of the outer portion, and help improve toughness of the outer portion. In another example, the compositions and grain size distributions of the first and second ceramic materials can facilitate improved corrosion resistance, mechanical stability, and reduced wear. It can be expected that the bearing block of embodiments herein can have improved service life.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiments

Embodiment 1. A bearing block, comprising: a body including: an exterior surface defined by a first ceramic material, an interior surface defining a central bore of the body, wherein the interior surface is defined by a second ceramic material, wherein the first ceramic material has a different characteristic than the second ceramic material, wherein the characteristic comprises: a grain size distribution; Modulus of Rupture; apparent porosity; coefficient of thermal expansion; or any combination thereof.

Embodiment 2. A bearing block, comprising: a body including: an outer portion defining an exterior surface of the body; and an inner portion coupled to the outer portion and extending coaxially with the outer portion, wherein the inner portion defines a central bore and an interior surface of the body, wherein the outer portion includes a first ceramic material, and the inner portion includes a second ceramic material.

Embodiment 3. The bearing block of embodiment 1 or 2, wherein the first ceramic material comprises grains having a multi-modal distribution.

Embodiment 4. The bearing block of any one of embodiments 1 to 3, wherein the first ceramic material comprises coarse grains and fine grains.

Embodiment 5. The bearing block of any one of embodiments 1 to 4, wherein the first ceramic material comprises a first type of coarse grains having grain sizes in a range from 150 microns to 1500 microns.

Embodiment 6. The bearing block of any one of embodiments 1 to 5, wherein the first ceramic material comprises a second type of coarse grains having grain sizes in a range from 20 microns to 150 microns.

Embodiment 7. The bearing block of any one of embodiments 1 to 6, wherein the first ceramic material comprises fine grains having grain sizes in a range from 0.1 microns to 10 microns.

Embodiment 8. The bearing block of any one of embodiments 1 to 7, wherein the second ceramic material comprises grains having a multi-model distribution.

Embodiment 9. The bearing block of any one of embodiments 1 to 8, wherein the second ceramic material comprises coarse grains having grain sizes in a range from 20 microns to 150 microns.

Embodiment 10. The bearing block of any one of embodiments 1 to 9, wherein the second ceramic material comprises fine grains having grain sizes in a range from 0.1 microns to 10 microns.

Embodiment 11. The bearing block of embodiment 1, wherein the body comprises an outer portion defining the exterior surface and an inner portion defining the interior surface, wherein the inner portion is coupled to the outer portion.

Embodiment 12. The bearing block of any one of embodiments 2 to 11, wherein an outer surface of the outer portion defines the exterior surface, and an inner surface of the inner portion defines the interior surface defining a sliding surface of the bearing block.

Embodiment 13. The bearing block of any one of embodiments 2 to 12, wherein an inner surface of the outer portion is in abutting contact with an outer surface of the inner portion.

Embodiment 14. The bearing block of any one of embodiments 2 to 13, wherein the inner portion is coupled to the outer portion in a manner such that the inner portion does not rotate relatively to the outer portion.

Embodiment 15. The bearing block of any one of embodiments 2 to 14, wherein the inner portion and the outer portion are interlocked in the radial direction and axial direction.

Embodiment 16. The bearing block of any one of embodiments 2 to 15, wherein an inner surface of the outer portion and an outer surface of the inner portion have complementary structures.

Embodiment 17. The bearing block of embodiment 16, wherein an inner surface of the outer portion comprises a recess extending into the inner surface of the outer portion, and the outer surface of the inner portion comprises a protrusion extending away from the outer surface of the inner portion.

Embodiment 18. The bearing block of embodiment 17, wherein each of the recess and protrusion extends for at least 10% of a length of the body, at least 13%, at least 16%, at least 20%, at least 30%, at least 40%, at least 50%, at least 60%, at least 65%, or at least 70% of the length of the body.

Embodiment 19. The bearing block of embodiment 17 or 18, wherein each of the recess and protrusion extends for an entire length of the body, at most 90%, at most 85%, at most 80%, at most 70%, at most 60%, at most 50%, at most 40%, or at most 30% of the length of the body.

Embodiment 20. The bearing block of any one of embodiments 17 to 19, wherein each of the recess and protrusion extends in the radial direction for at least 5% of a thickness of the inner portion, at least 10%, at least 15%, at least 20%, or at least 25% of the thickness of the inner portion.

Embodiment 21. The bearing block of any one of embodiments 17 to 20, wherein each of the recess and protrusion extends in the radial direction for at most 70% of the thickness of the inner portion, at most 60%, at most 50%, at most 40%, at most 30%, or at most 25% of the thickness of the inner portion.

Embodiment 22. The bearing block of any one of embodiments 12 to 14, wherein the outer surface of the inner portion comprises a flat region, and the inner surface of the outer portion comprises a matching flat region, wherein the outer surface of the inner portion is in abutting contact with the inner surface of the outer portion for an entire surface area of the inner surface of the outer portion.

Embodiment 23. The bearing block of any one of embodiments 2 to 22, wherein the inner portion is bonded to the outer portion.

Embodiment 24. The bearing block of embodiment 23, wherein the inner portion is sinter-bonded to the outer portion.

Embodiment 25. The bearing block of any one of embodiments 1 to 24, wherein the first ceramic material and the second ceramic material comprise a different Modulus of Rupture, wherein the second ceramic material comprises a greater Modulus of Rupture than the first ceramic material.

Embodiment 26. The bearing block of any one of embodiments 1 to 24, wherein the first ceramic material comprises a Modulus of Rupture at 20° C. of at most 120 MPa, at most 110 MPa, at most 100 MPa, at most 90 MPa, at most 80 MPa, at most 75 MPa, or at most 70 MPa.

Embodiment 27. The bearing block of any one of embodiments 1 to 26, wherein the first ceramic material comprises a Modulus of Rupture at 20° C. of at least 50 MPa, at least 55 MPa, at least 60 MPa, at least 65 MPa, or at least 69 MPa.

Embodiment 28. The bearing block of any one of embodiments 1 to 27, wherein the first ceramic material comprises a Modulus of Rupture at 1250° C. of at most 120 MPa, at most 110 MPa, at most 100 MPa, at most 90 MPa, at most 86 MPa, or at most 83 MPa.

Embodiment 29. The bearing block of any one of embodiments 1 to 28, wherein the first ceramic material comprises a Modulus of Rupture at 1250° C. of at least 60 MPa, at least 65 MPa, at least 70 MPa, at least 75 MPa, or at least 80 MPa.

Embodiment 30. The bearing block of any one of embodiments 1 to 29, wherein the first ceramic material comprises a Modulus of Rupture at 1450° C. of at most 110 MPa, at most 100 MPa, at most 90 MPa, at most 86 MPa, or at most 83 MPa, or at most 80 MPa.

Embodiment 31. The bearing block of any one of embodiments 1 to 30, wherein the first ceramic material comprises a Modulus of Rupture at 1450° C. of at least 60 MPa, at least 65 MPa, at least 70 MPa, or at least 75 MPa.

Embodiment 32. The bearing block of any one of embodiments 1 to 31, wherein the second ceramic material comprises a Modulus of Rupture at 20° C. of at most 230 MPa, at most 220 MPa, at most 210 MPa, at most 200 MPa, at most 190 MPa, or at most 180 MPa.

Embodiment 33. The bearing block of any one of embodiments 1 to 32, wherein the second ceramic material comprises a Modulus of Rupture at 20° C. of at least 85 MPa, at least 90 MPa, at least 95 MPa, at least 100 MPa, at least 110 MPa, at least 120 MPa, or at least 130 MPa.

Embodiment 34. The bearing block of any one of embodiments 1 to 33, wherein the second ceramic material comprises a Modulus of Rupture at 1250° C. of at most 240 MPa, at most 230 MPa, at most 220 MPa, at most 210 MPa, at most 200 MPa, or at most 190 MPa.

Embodiment 35. The bearing block of any one of embodiments 1 to 34, wherein the second ceramic material comprises a Modulus of Rupture at 1250° C. of at least 90 MPa, at least 110 MPa, at least 130 MPa, at least 140 MPa, at least 150 MPa, or at least 160 MPa.

Embodiment 36. The bearing block of any one of embodiments 1 to 35, wherein the second ceramic material comprises a Modulus of Rupture at 1450° C. of at most 255 MPa, at most 245 MPa, at most 230 MPa, at most 220 MPa, or at most 210 MPa, at most 200, or at most 190 MPa.

Embodiment 37. The bearing block of any one of embodiments 1 to 36, wherein the second ceramic material comprises a Modulus of Rupture at 1450° C. of at least 100 MPa, at least 105 MPa, at least 110 MPa, at least 120 MPa, at least 130 MPa, at least 150 MPa, or at least 160 MPa.

Embodiment 38. The bearing block of any one of embodiments 1 to 37, wherein the first material comprises a primary phase including a carbide, and a secondary phase including a nitride, an oxide, or any combination thereof.

Embodiment 39. The bearing block of embodiment 38, wherein the primary phase is at least 51 wt % of a total weight of the outer portion, at least 55 wt %, at least 60 wt %, at least 65 wt %, at least 68 wt %, at least 70 wt %, at least 73 wt %, or at least 75 wt % of the total weight of the outer portion.

Embodiment 40. The bearing block of embodiment 38 or 39, wherein the primary phase is at most 95 wt % of a total weight of the outer portion, at most 90 wt %, at most 85 wt %, at most 80 wt %, or at most 75 wt % of the total weight of the outer portion.

Embodiment 41. The bearing block of any one of embodiments 38 to 40, wherein the primary phase comprises silicon carbide.

Embodiment 42. The bearing block of any one of embodiments 38 to 40, wherein the primary phase consists of silicon carbide.

Embodiment 43. The bearing block of any one of embodiments 1 to 42, wherein the first ceramic material comprises SiC grains having a multi-model distribution.

Embodiment 44. The bearing block of any one of embodiments 5 to 43, wherein the first ceramic material comprises SiC grains, wherein at least a majority of the SiC grains are the first type of coarse grains.

Embodiment 45. The bearing block of embodiment 44, wherein at least 50 wt % of the SiC grains for a total weight of the SiC grains are the first type of coarse grains, at least 55 wt %, at least 60 wt %, at least 63 wt %, or at least 66 wt % of the SiC grains for the total weight of the SiC grains are the first type of coarse grains.

Embodiment 46. The bearing block of any one of embodiments 5 to 45, wherein the first ceramic material comprises SiC grains, wherein at most 85 wt % for the total weight of the SiC grains of the SiC grains are the first type of coarse grains, at most 82 wt %, at most 78 wt %, at most 75 wt %, or at most 70 wt %, or at most 67 wt % for the total weight of the SiC grains are the first type of coarse grains.

Embodiment 47. The bearing block of embodiment 45 or 46, wherein approximately ⅔ of the total weight of the SiC grains are the first type of coarse grains.

Embodiment 48. The bearing block of any one of embodiments 5 to 47, wherein the first ceramic material comprises SiC grains, wherein at least 10 wt % of the SiC grains for a t total weight of the SiC grains are the second type of coarse grains, at least 11 wt %, at least 12 wt %, or at least 13 wt % of the SiC grains for a total weight of the SiC grains are the second type of coarse grains.

Embodiment 49. The bearing block of any one of embodiments 5 to 48, wherein the first ceramic material comprises SiC grains, wherein at most 25 wt % for the total weight of the SiC grains of the SiC grains are the second type of coarse grains, at most 22 wt %, at most 20 wt %, at most 18 wt %, at most 17 wt %, or at most 16.5 wt % for the total weight of the SiC grains are the second type of coarse grains.

Embodiment 50. The bearing block of any one of embodiments 5 to 49, wherein the first ceramic material comprises SiC grains, wherein at least 10 wt % of the SiC grains for a t total weight of the SiC grains are the fine grains, at least 11 wt %, at least 12 wt %, or at least 13 wt % of the SiC grains for a total weight of the SiC grains are the fine grains.

Embodiment 51. The bearing block of any one of embodiments 5 to 50, wherein the first ceramic material comprises SiC grains, wherein at most 25 wt % for the total weight of the SiC grains of the SiC grains are fine grains, at most 22 wt %, at most 20 wt %, at most 18 wt %, at most 17 wt %, or at most 16.5 wt % for the total weight of the SiC grains are the fine grains.

Embodiment 52. The bearing block of any one of embodiments 36 to 51, wherein the secondary phase is at least 10 wt % of a total weight of the outer portion, at least 12 wt %, at least 15 wt %, at least 18 wt %, at least 20 wt %, or at least 23 wt % of a total weight of the outer portion.

Embodiment 53. The bearing block of any one of embodiments 36 to 52, wherein the secondary phase is at most 49 wt % of a total weight of the outer portion, at most 43 wt %, at most 40 wt %, at most 37 wt %, at most 33 wt %, at most 30 wt %, at most 27 wt %, or at most 25 wt % of the total weight of the outer portion.

Embodiment 54. The bearing block of any one of embodiments 36 to 53, wherein the secondary phase comprises at least 51 wt % of a nitride for a total weight of the secondary phase, at least 60 wt %, at least 70 wt %, at least 80 wt %, or at least 90 wt % for a total weight of the secondary phase.

Embodiment 55. The bearing block of any one of embodiments 36 to 54, wherein the secondary phase comprises at most 99 wt % of a nitride for a total weight of the secondary phase, at most 97 wt %, at most 95 wt %, at most 92 wt % of a nitride for the total weight of the secondary phase.

Embodiment 56. The bearing block of any one of embodiments 36 to 55, wherein the secondary phase comprises at least 0.5 wt % of an oxide for a total weight of the secondary phase, at least 0.7 wt %, at least 1 wt %, at least 3 wt %, at least 5 wt %, or at least 8 wt % of the oxide for a total weight of the secondary phase.

Embodiment 57. The bearing block of any one of embodiments 36 to 56, wherein the secondary phase comprises at most 20 wt % of an oxide for a total weight of the second phase, at most 18 wt %, at most 16 wt %, at most 14 wt %, at most 12 wt %, at most 10 wt %, or at most 8 wt % of the oxide for the total weight of the secondary phase.

Embodiment 58. The bearing block of any one of embodiments 36 to 57, wherein the secondary phase consists essentially of the nitride and oxide.

Embodiment 59. The bearing block of any one of embodiments 36 to 58, wherein the secondary phase comprises silicon nitride.

Embodiment 60. The bearing block of any one of embodiments 36 to 59, wherein the outer portion comprises silicon nitride bonded silicon carbide.

Embodiment 61. The bearing block of any one of embodiments 36 to 60, wherein the outer portion consists essentially of silicon nitride bonded silicon carbide.

Embodiment 62. The bearing block of any one of embodiments 36 to 57, wherein the secondary phase comprises silicon oxynitride.

Embodiment 63. The bearing block of any one of embodiments 36 to 57 and 62, wherein the outer portion comprises silicon oxynitride bonded silicon carbide.

Embodiment 64. The bearing block of any one of embodiments 36 to 57 and 62 to 63, wherein the outer portion consists essentially of silicon oxynitride bonded silicon carbide.

Embodiment 65. The bearing block of any one of embodiments 1 to 64, wherein the second material comprises a primary phase including a carbide and a secondary phase including a nitride.

Embodiment 66. The bearing block of embodiment 65, wherein the primary phase is at least 51 wt % of a total weight of the inner portion, at least 55 wt %, at least 60 wt %, at least 65 wt %, at least 68 wt %, at least 70 wt % of the total weight of the inner portion.

Embodiment 67. The bearing block of embodiment 65 or 66, wherein the primary phase is at most 90 wt % of a total weight of the inner portion, at most 85 wt %, at most 80 wt %, at most 75 wt %, or at most 70 wt % of the total weight of the inner portion.

Embodiment 68. The bearing block of any one of embodiments 65 to 67, wherein the primary phase comprises silicon carbide, where the primary phase consists of silicon carbide.

Embodiment 69. The bearing block of any one of embodiments 65 to 68, wherein the secondary phase is at least 10 wt % of a total weight of the inner portion, at least 12 wt %, at least 15 wt %, at least 18 wt %, at least 20 wt %, at least 25 wt %, or at least 30 wt % of a total weight of the inner portion.

Embodiment 70. The bearing block of any one of embodiments 65 to 69, wherein the secondary phase is at most 49 wt % of a total weight of the inner portion, at most 45 wt %, at most 40 wt %, at most 36 wt %, at most 33 wt %, or at most 30 wt % of the total weight of the inner portion.

Embodiment 71. The bearing block of any one of embodiments 65 to 70, wherein the secondary phase comprises silicon nitride, wherein the secondary phase consists of silicon nitride.

Embodiment 72. The bearing block of any one of embodiments 65 to 71, wherein the inner portion comprises silicon nitride bonded silicon carbide, wherein the inner portion consists of silicon nitride bonded silicon carbide.

Embodiment 73. The bearing block of any one of embodiments 1 to 72, wherein the first ceramic material and the second ceramic material comprises a different apparent porosity.

Embodiment 74. The bearing block of any one of embodiments 1 to 73, wherein the first ceramic material comprises an apparent porosity of at least 0.1 vol % for a total volume of the first ceramic material, at least 0.5 vol %, at least 1 vol %, at least 2 vol %, at least 4 vol %, at least 6 vol %, at least 8 vol %, at least 9 vol %, at least 10 vol %, or at least 12 vol %.

Embodiment 75. The bearing block of any one of embodiments 1 to 74, wherein the first ceramic material comprises an average apparent porosity of at most 16 vol % for a total volume of the first ceramic material, at most 14 vol %, at most 13 vol %, at most 11 vol %, at most 9 vol %, at most 8 vol %, at most 6 vol %, at most 5 vol %, or at most 4 vol % for a total volume of the first ceramic material.

Embodiment 76. The bearing block of any one of embodiments 1 to 75, wherein the second ceramic material comprises an average apparent porosity of at least 0.2 vol % for a total volume of the second ceramic material, at least 0.4 vol %, at least 0.6 vol %, at least 0.8 vol %, at least 1 vol %, at least 1.2 vol %, at least 1.5 vol %, or at least 2 vol % for a total volume of the second ceramic material.

Embodiment 77. The bearing block of any one of embodiments 1 to 76, wherein the second ceramic material comprises an average apparent porosity of at most 5 vol % for a total volume of the second ceramic material, at most 4.5 vol %, at most 4 vol %, at most 3.5 vol %, at most 3 vol %, at most 2 vol %, at most 1.5 vol %, at most 1 vol %, at most 0.8 vol %, at most 0.6 vol %, at most 0.4 vol %, or at most 0.2 vol % for a total volume of the second ceramic material.

Embodiment 78. The bearing block of any one of embodiments 2 to 77, wherein the outer portion comprises a porosity of at most 16 vol % for a total volume of the outer portion, at most 14 vol %, at most 13 vol %, at most 11 vol %, at most 9 vol %, at most 8 vol %, at most 6 vol %, at most 5 vol %, or at most 4 vol % for the total volume of the outer portion.

Embodiment 79. The bearing block of any one of embodiments 2 to 78, wherein the outer portion comprises a porosity of at least 1 vol % for the total volume of the outer portion, at least 2 vol %, at least 4 vol %, at least 6 vol %, at least 8 vol %, at least 9 vol %, at least 10 vol %, or at least 12 vol % for the total volume of the outer portion.

Embodiment 80. The bearing block of any one of embodiments 2 to 79, wherein the inner portion comprises a porosity of at most 5 vol % for the total volume of the inner portion, at most 4.5 vol %, at most 4 vol %, at most 3.5 vol %, at most 3 vol %, at most 2 vol %, at most 1.5 vol %, at most 1 vol %, at most 0.8 vol %, at most 0.6 vol %, at most 0.4 vol %, or 0.2 vol % for the total volume of the inner portion.

Embodiment 81. The bearing block of any one of embodiments 2 to 63, wherein the outer portion comprises a porosity of at least 0.2 vol % for a total volume of the inner portion, at least 0.4 vol %, at least 0.6 vol %, at least 0.8 vol %, at least 1 vol %, at least 1.2 vol %, at least 1.5 vol %, or at least 2 vol % for the total volume of the inner portion.

Embodiment 82. The bearing block of any one of embodiments 1 to 81, wherein the first ceramic material comprises a first co-efficient of thermal expansion, and the second ceramic material comprises a second co-efficient of thermal expansion, wherein a difference between the first and second co-efficient of thermal expansion, δCTE, is within ±55% of the greater of the first and second co-efficient of thermal expansion, within ±50%, within ±46%, within ±40%, within ±36%, within ±30%, or within ±26% of the greater of the first and second co-efficient of thermal expansion, wherein the second co-efficient of thermal expansion is greater than the first co-efficient of thermal expansion.

Embodiment 83. The bearing block of any one of embodiments 1 to 65, wherein the first ceramic material comprises a first co-efficient of thermal expansion, and the second ceramic material comprises a second co-efficient of thermal expansion that is different from the first co-efficient of thermal expansion.

Embodiment 84. The bearing block of embodiment 83, wherein the first co-efficient of thermal expansion is smaller than the second co-efficient of thermal expansion.

Embodiment 85. The bearing block of any one of embodiments 1 to 84, wherein the first ceramic material comprises a first co-efficient of thermal expansion of at least $1.8 \times 10^{-6}$ per° C., at least $2.1 \times 10^{-6}$ per° C., at least $2.5 \times 10^{-6}$ per° C., at least $3.0 \times 10^{-6}$ per° C., at least $3.3 \times 10^{-6}$ per° C., at least $3.5 \times 10^{-6}$ per° C., at least $3.8 \times 10^{-6}$ per° C., at least $4.0 \times 10^{-6}$ per° C., or at least $4.3 \times 10^{-6}$ per° C. in a temperature range from 30 to 1500° C.

Embodiment 86. The bearing block of any one of embodiments 1 to 85, wherein the first ceramic material comprises a first co-efficient of thermal expansion of at most $6.1 \times 10^{-6}$ per° C., at most $5.8 \times 10^{-6}$ per° C., at most $5.3 \times 10^{-6}$ per° C., at most $5.0\times10^{-6}$ per° C., at most $4.7\times10^{-6}$ per° C., or at most $4.5\times10^{-6}$ per° C. in a temperature range from 30 to 1500° C.

Embodiment 87. The bearing block of any one of embodiments 1 to 86, wherein the second ceramic material comprises a second co-efficient of thermal expansion of at least $1.1\times10^{-6}$ per° C., at least $1.4\times10^{-6}$ per° C., at least $1.8\times10^{-6}$ per° C., at least $2.2\times10^{-6}$ per° C., at least $2.5\times10^{-6}$ per° C., at least $2.7\times10^{-6}$ per° C., at least $3.0\times10^{-6}$ per° C., or at least $3.2\times10^{-6}$ per° C. in a temperature range from 30 to 1500° C.

Embodiment 88. The bearing block of any one of embodiments 1 to 87, wherein the second ceramic material comprises a second co-efficient of thermal expansion of at most $5.2\times10^{-6}$ per° C., at most $4.8\times10^{-6}$ per° C., at most $4.4\times10^{-6}$ per° C., at most $4.1\times10^{-6}$ per° C., at most $3.7\times10^{-6}$ per° C., at most $3.4\times10^{-6}$ per° C., or at most $3.2\times10$ per° C. in a temperature range from 30 to 1500° C.

Embodiment 89. The bearing block of any one of embodiments 1 to 88, wherein the first ceramic material has a thermal conductivity at 650° C. of at least 10 W/mK, such as at least 11 W/mK or at least 12 W/mK or at least 13 W/mK or at least 14 W/mK or at least 15 W/mK or at least 16 W/mK or at least 17 W/mK or at least 18 W/mK.

Embodiment 90. The bearing block of any one of embodiments 1 to 89, wherein the first ceramic material has a thermal conductivity at 650° C. of not greater than 30 W/mK or not greater than 28 W/mK or not greater than 26 W/mK or not greater than 24 W/mK or not greater than 22 W/mK or not greater than 20 W/mK or not greater than 19 W/mK.

Embodiment 91. The bearing block of any one of embodiments 1 to 90, wherein the second ceramic material has a thermal conductivity at 650° C. of at least 14 W/mK, such as at least 16 W/mK or at least 18 W/mK or at least 20 W/mK or at least 22 W/mK or at least 23 W/mK or at least 24 W/mK or at least 25 W/mK.

Embodiment 92. The bearing block of any one of embodiments 1 to 91, wherein the second ceramic material has a thermal conductivity at 650° C. of not greater than 35 W/mK or not greater than 33 W/mK or not greater than 30 W/mK or not greater than 28 W/mK or not greater than 26 W/mK or not greater than 25 W/mK or not greater than 24 W/mK.

Embodiment 93. The bearing block of any one of embodiments 2 to 92, wherein the inner portion consists of the second ceramic material.

Embodiment 94. The bearing block of any one of embodiments 2 to 93, wherein the outer portion consists of the first ceramic material.

Embodiment 95. The bearing block of any one of embodiments 1 to 94, wherein the exterior surface comprises at least 1 face, at least 2, at least 3, at least 4, at least 5, at least 6 or at least 8 faces.

Embodiment 96. The bearing block of any one of embodiments 1 to 95, wherein the body has an octagonal shape, a triangular, a hexagonal, or a square shape.

Embodiment 97. The bearing block of any one of embodiments 1 to 96, wherein the body has a cylindrical shape.

Embodiment 98. A system, comprising: the bearing block of any one of embodiments 1 to 80; and a shaft placed in the center bore of the body of the bearing block, wherein the bearing block and the shaft is configured to be submerged in a molten metal.

Embodiment 99. The system of embodiment 98, comprising a shaft sleeve disposed between the shaft and the interior surface of the body of the bearing block.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Many different aspects and embodiments are possible. Some of those aspects and embodiments are described herein. After reading this specification, skilled artisans will appreciate that those aspects and embodiments are only illustrative and do not limit the scope of the present invention. Additionally, those skilled in the art will understand that some embodiments that include analog circuits can be similarly implement using digital circuits, and vice versa.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive. Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The Abstract of the Disclosure is provided to comply with Patent Law and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter.

What is claimed is:

1. A bearing block, comprising:
   a body including:
   an outer portion defining an exterior surface of the body; and
   an inner portion coupled to the outer portion and extending coaxially with the outer portion, wherein the inner portion defines a central bore and an interior surface of the body, wherein the outer portion includes a first ceramic material, and the inner portion includes a second ceramic material; and wherein the first ceramic material has a different grain size distribution than the second ceramic material.

2. The bearing block of claim 1, wherein the first ceramic material comprises:
a first type of coarse grains having grain sizes in a range from 150 microns to 1500 microns;
a second type of coarse grains having grain sizes in a range from 20 microns to 150 microns; and
fine grains having grain sizes in a range from 0.1 microns to 10 microns.

3. The bearing block of claim 1, wherein the second ceramic material comprises coarse grains having grain sizes in a range from 20 microns to 150 microns and fine grains having grain sizes in a range from 0.1 microns to 10 microns.

4. The bearing block of claim 1, wherein an inner surface of the outer portion is in abutting contact with an outer surface of the inner portion.

5. The bearing block of claim 4, wherein an inner surface of the outer portion and an outer surface of the inner portion have complementary structures.

6. The bearing block of claim 5, wherein:
the inner surface of the outer portion comprises a recess extending into the outer portion; and
the outer surface of the inner portion comprises a protrusion extending away from the central bore,
wherein the recess and protrusion extends for:
at least 10% and at most 90% of a length of the body in an axial direction;
at least 5% and at most 70% of a thickness of the inner portion in a radial direction; or
any combination thereof.

7. The bearing block of claim 4, wherein an outer surface of the inner portion comprises a flat region, and an inner surface of the outer portion comprises a matching flat region in abutting contact with the flat region at the outer surface of the inner portion.

8. The bearing block of claim 1, wherein the inner portion is coupled to the outer portion in a manner such that the inner portion does not rotate relatively to the outer portion.

9. The bearing block of claim 1, wherein the inner portion and the outer portion are interlocked in the radial direction and axial direction.

10. A bearing block, comprising:
a body including:
an exterior surface defined by a first ceramic material,
an interior surface defining a central bore of the body, wherein the interior surface is defined by a second ceramic material,
wherein the first ceramic material has a different characteristic than the second ceramic material, wherein the characteristic comprises:
Modulus of Rupture;
apparent porosity;
coefficient of thermal expansion; or
any combination thereof; and
wherein the first ceramic material has a different grain size
distribution than the second ceramic material.

11. The bearing block of claim 10, wherein the first ceramic material comprises:
a first type of coarse grains having grain sizes in a range from 150 microns to 1500 microns;
a second type of coarse grains having grain sizes in a range from 20 microns to 150 microns; and
fine grains having grain sizes in a range from 0.1 microns to 10 microns.

12. The bearing block of claim 10, wherein the second ceramic material comprises coarse grains having grain sizes in a range from 20 microns to 150 microns and fine grains having grain sizes in a range from 0.1 microns to 10 microns.

13. A bearing block, comprising:
a body including:
an outer portion defining an exterior surface of the body; and
an inner portion coupled to the outer portion and extending coaxially with the outer portion, wherein the inner portion defines a central bore and an interior surface of the body,
wherein the outer portion includes a first ceramic material, and the inner portion includes a second ceramic material; and
wherein the first ceramic material comprises:
a first type of coarse grains having grain sizes in a range from 150 microns to 1500 microns;
a second type of coarse grains having grain sizes in a range from 20 microns to 150 microns; and
fine grains having grain sizes in a range from 0.1 microns to 10 microns.

14. The bearing block of claim 13, wherein the second ceramic material comprises coarse grains having grain sizes in a range from 20 microns to 150 microns and fine grains having grain sizes in a range from 0.1 microns to 10 microns.

15. The bearing block of claim 13, wherein the second ceramic material comprises a greater Modulus of Rupture than the first ceramic material.

16. The bearing block of claim 13, wherein the first ceramic material comprises an oxide, carbide, boride, nitride, or any combination thereof; and wherein the second ceramic material comprises an oxide, carbide, nitride, or any combination thereof.

* * * * *